United States Patent
Sakamoto

(10) Patent No.: US 8,359,330 B2
(45) Date of Patent: Jan. 22, 2013

(54) CONTENTS DELETION/UPDATE APPARATUS, CONTENTS DELETION/UPDATE METHOD AND RECORDING MEDIUM

(75) Inventor: Takuya Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 12/579,076

(22) Filed: Oct. 14, 2009

(65) Prior Publication Data

US 2010/0114949 A1    May 6, 2010

(30) Foreign Application Priority Data

Nov. 6, 2008 (JP) ................. 2008-285652

(51) Int. Cl.
G06F 17/30 (2006.01)
G06F 7/00 (2006.01)

(52) U.S. Cl. ....................................... 707/777

(58) Field of Classification Search .................. None
See application file for complete search history.

(56) References Cited

U.S. PATENT DOCUMENTS

| | | | | |
|---|---|---|---|---|
| 6,347,336 B1 * | 2/2002 | Song et al. | ...... | 709/223 |
| 7,246,160 B2 * | 7/2007 | Yamabe | ...... | 709/223 |
| 7,567,547 B2 * | 7/2009 | Mosko et al. | ...... | 370/351 |
| 7,929,550 B2 * | 4/2011 | Namihira et al. | ...... | 370/401 |
| 8,015,269 B2 * | 9/2011 | Kiyohara et al. | ...... | 709/220 |
| 2005/0195755 A1 | 9/2005 | Senta et al. | | |
| 2008/0172478 A1 | 7/2008 | Kiyohara et al. | | |

FOREIGN PATENT DOCUMENTS

| | | |
|---|---|---|
| JP | H05-274210 A | 10/1993 |
| JP | 2002-344477 | 11/2002 |
| JP | 2007-58275 A | 3/2007 |
| WO | WO-2004/030273 A1 | 4/2004 |

OTHER PUBLICATIONS

Japanese Office Action mailed Sep. 11, 2012 for corresponding Japanese Application No. 2008-285652, with English-language translation.

* cited by examiner

Primary Examiner — Sathyanarayan Pannala
(74) Attorney, Agent, or Firm — Fujitsu Patent Center

(57) ABSTRACT

A contents deletion/update system includes plural nodes which delete or update contents shared by the plural nodes mutually connected via a network. A management node includes a first transmitter transmitting an instruction to cause another node to delete or update the contents based on owning node information, and a second transmitter transmitting non-responding node information when there is a non-responding node. Each of the other nodes includes the first receiver receiving an instruction to delete or update the contents, an editor deleting or updating the contents according to the instruction, the first transmitter transmitting a response to the management node, the second receiver receiving non-responding node information from the management node and storing the non-responding node information in a storage unit, and the second transmitter transmitting the instruction to the non-responding node based on the non-responding node information when recognizing that the non-responding node makes access.

18 Claims, 35 Drawing Sheets

FIG. 3A

| CONTENTS ID | NODE INFORMATION (IP ADDRESS: PORT) |
|---|---|
| 00000001 | 192.168.1.1:10000 |
| 00000001 | 192.168.1.4:10000 |
| 00000001 | 192.168.1.5:10000 |
|  |  |

FIG. 3B

```
<?xml version="1.0"?>
<nodes action="info" contentid="00000001">
    <node ip="192.168.1.1" port="10000"/>
    <node ip="192.168.1.4" port="10000"/>
    <node ip="192.168.1.5" port="10000"/>
       .
       .
</nodes>
```

FIG. 4

DELETION INSTRUCTION

<?xml version="1.0"?>
<command action="delete" contentid="00000001">

UPDATE INSTRUCTION

<?xml version="1.0"?>
<command action="update" contentid="00000001" version="1.1">

FIG. 5A

```
<?xml version="1.0"?>
<nodes action="delete" contentid="00000001">
  <node ip="192.168.1.4" port="10000"/>
    .
    .
</nodes>
```

FIG. 5B

| CONTENTS ID | NODE INFORMATION (IP ADDRESS: PORT) |
|---|---|
| 00000001 | 192.168.1.4:10000 |
| : | : |

FIG. 12

```
<?xml version="1.0"?>
<nodes action="deleted" contentid="00000001">
  <node ip="192.168.1.4" port="10000"/>
     .
     .
</nodes>
```

FIG. 17A

```
<?xml version="1.0"?>
<nodes action="alternative" contentid="00000001">
    <node ip="192.168.1.1" port="10000"/>
    <node ip="192.168.1.5" port="10000"/>
        .
        .
        .
</nodes>
```

FIG. 17B

| CONTENTS ID | PROXY MANAGEMENT NODE INFORMATION (IP ADDRESS: PORT) |
|---|---|
| 00000001 | 192.168.1.1:10000 |
| 00000001 | 192.168.1.5:10000 |
| : | : |

FIG. 22

```
<?xml version="1.0"?>
<nodes action="delete" contentid="00000001">
  <node ip="192.168.1.4" port="10000"/>
    .
    .
    .
</nodes>
<condition action="end" date="2007/10/29"/>
```

FIG. 25

```
<?xml version="1.0"?>
<nodes action="alternative" contentid="00000001">
    <node ip="192.168.1.1" port="10000"/>
    <node ip="192.168.1.5" port="10000"/>
        .
        .
    <node ip="192.168.2.1" port="10000"/>
</nodes>
```
} NODE LIKELY TO COMMUNICATE

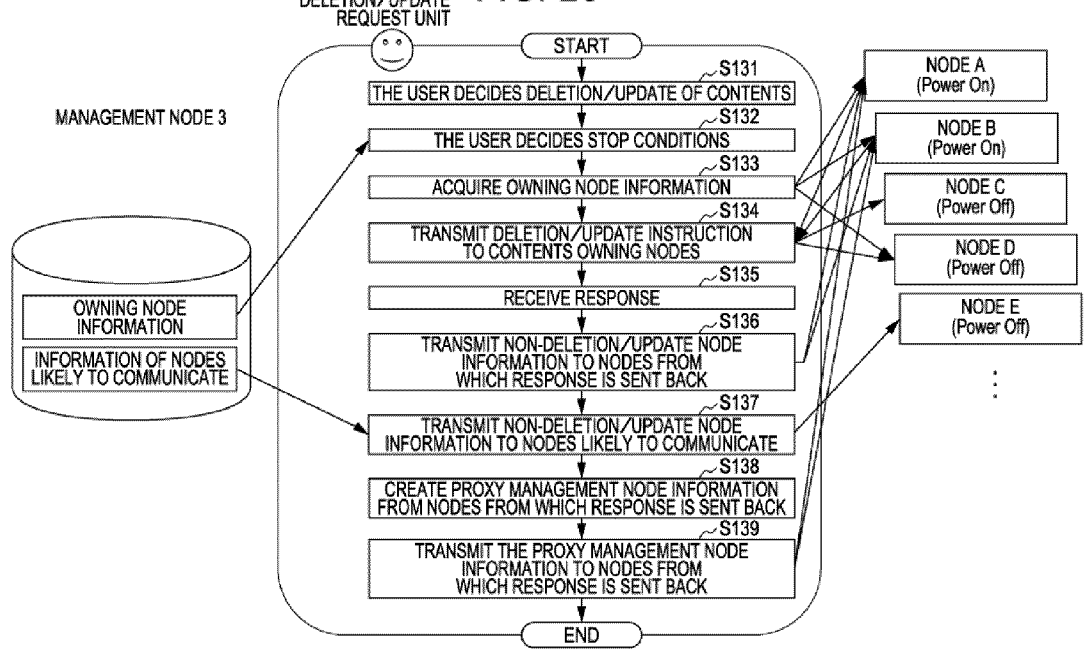

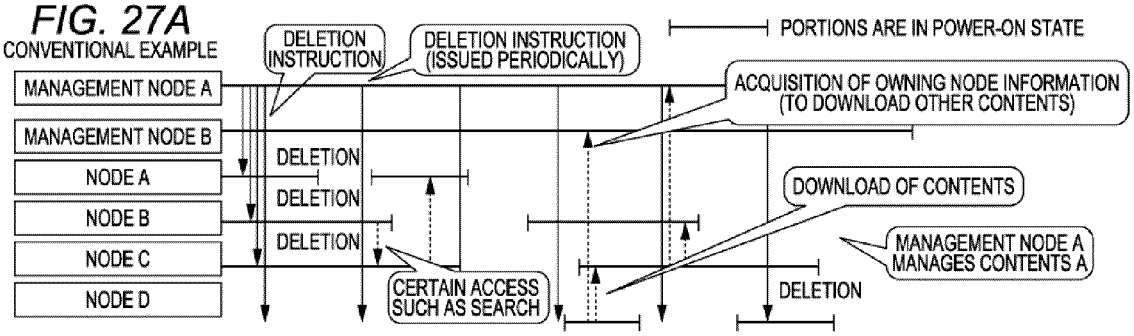
FIG. 27A CONVENTIONAL EXAMPLE
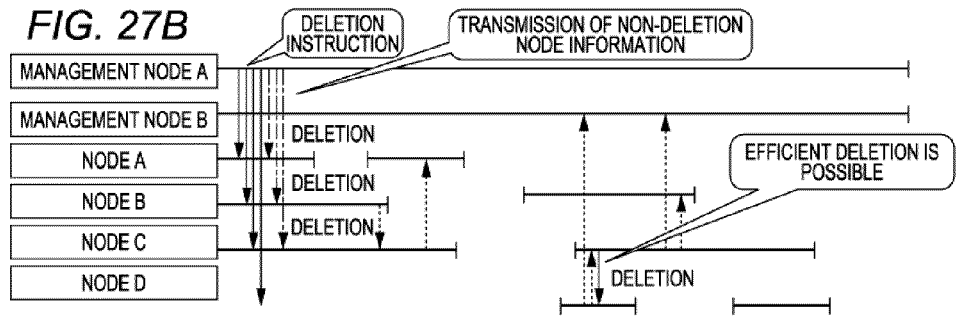
FIG. 27B

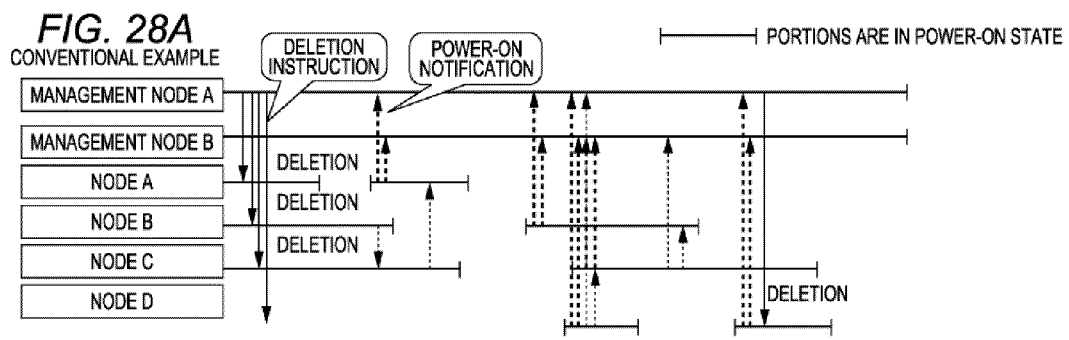
FIG. 28A CONVENTIONAL EXAMPLE
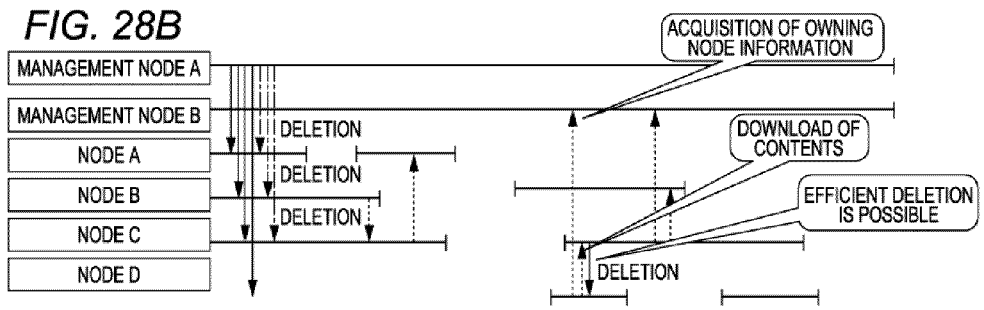
FIG. 28B

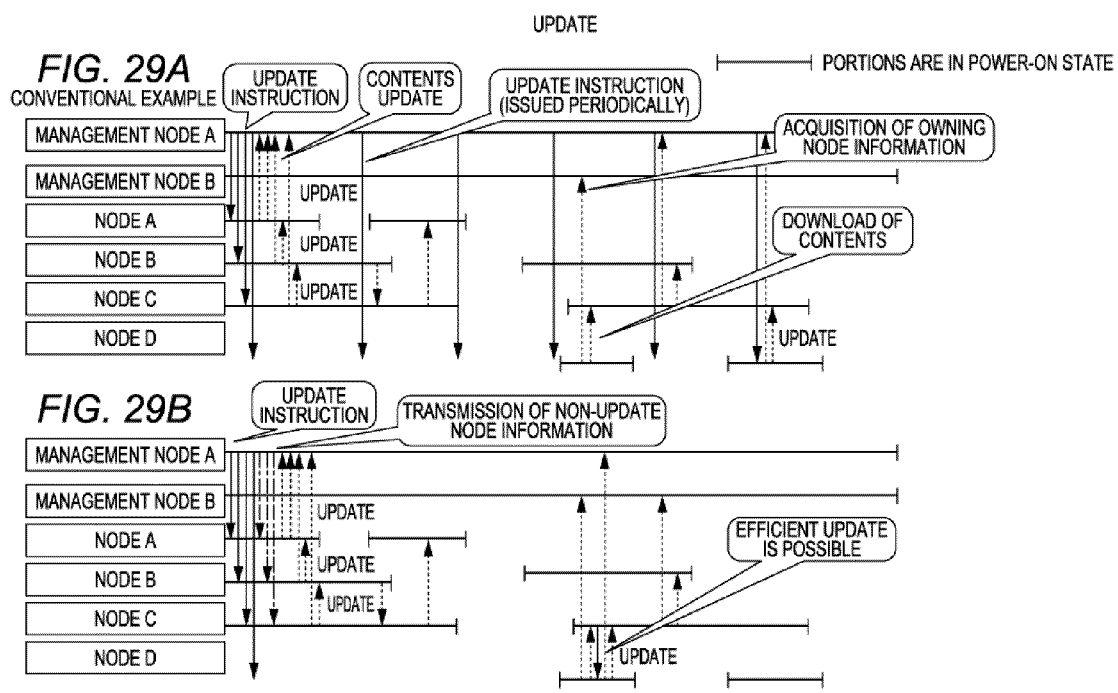

CONTENTS DELETION/UPDATE APPARATUS, CONTENTS DELETION/UPDATE METHOD AND RECORDING MEDIUM

CROSS-REFERENCE TO RELATED APPLICATIONS

This application is based upon and claims the benefit of priority of the prior Japanese Patent Application No. 2008-285652, filed on Nov. 6, 2008, the entire contents of which are incorporated herein by reference.

FIELD

Embodiments of the present invention relate to technology to delete or update contents in a system in which contents are shared by a plurality of nodes in a network. In particular, embodiments of the present invention relate to technology to delete or update contents in a peer-to-peer (P2P) system.

BACKGROUND

In recent years, contents delivery services have been widely used and such services are mostly realized by a mechanism in which a server that receives a request from a client delivers contents to the client. In this mode, there is a problem that the server load increases with an increasing number of clients (users). Such a problem may effectively be solved by using a P2P-type delivery service that exchanges data between user nodes. A node in an application concerned is a terminal such a personal computer and communication instrument connected to a network and a link in the network connects nodes. For example, 'BitTorrent' is an example of the P2P-type delivery service. FIG. 32 depicts an example of the configuration of a P2P-type delivery system using conventional 'BitTorrent.'

As depicted in FIG. 32, for example, a node in a network is assigned a role of managing nodes in 'BitTorrent.' The node that manages nodes will be called a management node. A node in the network acquires contents according to procedures (1) to (3) depicted in FIG. 32.

That is, procedure (1): Node E accesses the management node of contents A to receive information about a node having the whole or a portion of the contents from the management node. Procedure (2): the management node adds, to node information, information about the node (Node E) that makes a request. Procedures (3): Node E accesses another node such as Node A or Node D (having the contents) based on the received information to receive the contents.

Here, a provider of contents may preferably delete or update contents once delivered. In such a case, in a system in which a server delivers contents collectively, contents are deleted or updated by the server so that deleted contents or contents of an older version are not delivered thereafter. In a P2P mode system, however, contents are transmitted and received between nodes and therefore, even if an update or the like is performed by the server, there is a possibility that deleted contents or contents of an older version are delivered thereafter.

In addition, contents held by a node that receives contents may be preferably deleted or updated so that the original contents are not used.

For example, according to Japanese Patent Application Laid-Open No. Hei05-274210 as a publicly known technology concerning file sharing, a technology that may reduce the number of times of access to a network and the amount of transfer data in the network in which a file of a file server is shared by issuing an access request to the file server when a node does not have the file cached in a local machine is discussed.

SUMMARY

It is an aspect of the embodiments discussed herein to provide a contents deletion/update apparatus. The contents deletion/update apparatus functions as a node which deletes or updates contents shared by a plurality of nodes mutually connected via a network. The contents deletion/update apparatus executes transmitting a deletion/update instruction to cause the nodes owning the contents to delete or update the contents based on owning node information indicating owning nodes which own the contents, and transmitting, to a responding node that sends back a response to the deletion/update instruction, non-responding node information indicating a non-responding node if there is any non-responding node that does not respond to the deletion/update instruction.

For example, a method depicted in FIG. 33 may be considered as a method of causing nodes in a network to reflect a deletion or an update of contents in a P2P mode system. That is, the management node transmits a deletion/update instruction to each node according to information of the node owning contents A. If there is any node that is turned off when such a deletion instruction or the like is transmitted from the management node, the management node periodically transmits the deletion instruction or the like until a response is received from the relevant node (Node D in the example in FIG. 33).

As another method, for example, as depicted in FIG. 34, a method by which when a node is switched from a power-off state to a power-on state an individual node notifies the management node of the power-on, may be preferably considered.

There is a method that if, as depicted in FIG. 35, a node (Node D) in a power-off state is present when a request of deletion or the like of contents A is made by the management node of contents A, a node (Node A) among nodes holding the contents A is caused to operate in place of the management node. The Node A transmits a deletion instruction or the like to the Node D.

Further, according to an aspect of the embodiments, any combinations of the described features, functions and/or operations may be provided.

A node that receives non-responding node information from the management node holding owning node information of contents transmits, when accessed from a node indicated by the received non-responding node information, a deletion/update instruction to the accessing node to cause the node to delete/update contents.

The object and advantages of the embodiment discussed herein will be realized and attained by means of elements and combinations particularly pointed out in the claims.

It is to be understood that both the foregoing general description and the following detailed and the following detailed description are exemplary and only are not restrictive exemplary explanatory are not restrictive of the invention, as claimed.

BRIEF DESCRIPTION OF THE DRAWINGS

FIG. 3A and FIG. 3B are examples of owning node information;

FIG. 4 is an example of a deletion request and that of an update request;

FIG. 5A and FIG. 5B are examples of non-deletion/update node information;

FIG. 12 is an example of data of which the management node is notified;

FIG. 17A and FIG. 17B are examples of proxy management node information;

FIG. 22 is an example of non-deletion/update node information and stop conditions transmitted from the management node to nodes;

FIG. 25 is an example of non-deletion/update node information transmitted from the management node to nodes;

FIG. 26 is an operation chart depicting an example of processing concerning deletion/update of contents in the management node according to a sixth embodiment;

FIG. 27A and FIG. 27B are diagrams (Part 1) illustrating effects of an example of the deletion method of contents according to the embodiments;

FIG. 28A and FIG. 28B are diagrams (Part 2) illustrating effects of an example of the deletion method of contents according to the embodiments;

FIG. 29A and FIG. 29B are diagrams illustrating effects of the update method of contents according to the embodiments;

DETAILED DESCRIPTION OF THE EMBODIMENTS

Figure 33:
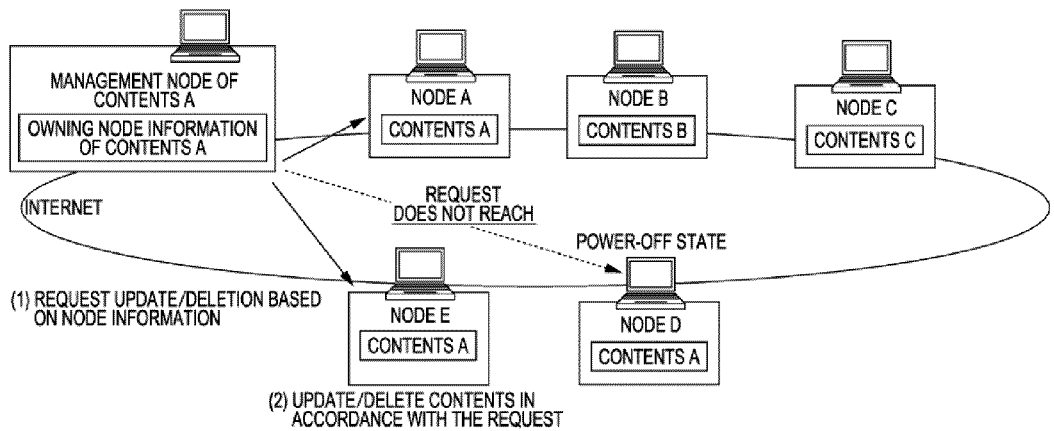
FIG. 33 is a diagram (Part 1) illustrating an example of a conventional deletion/update method of contents.

According to the method in FIG. 33, when the number of nodes in a network increases, a problem of increased communications traffic is expected because the number of nodes in a power-off state increases and because instructions are transmitted regularly from the management node to nodes in the power-off state.

Figure 34:
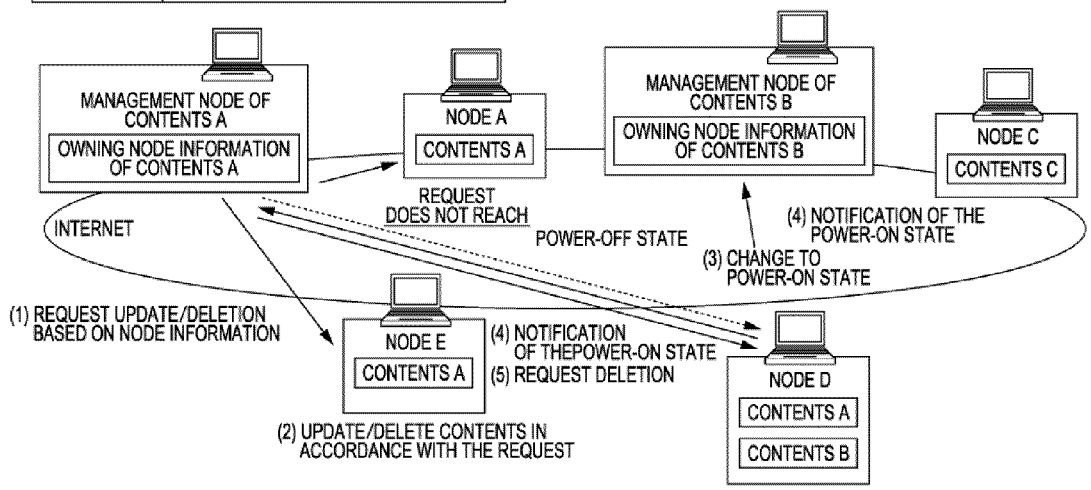
FIG. 34 is a diagram (Part 2) illustrating an example of the conventional deletion/update method of contents.

According to the method depicted in FIG. 34, each node preferably performs communication with the management node each time the node becomes communicable. If there is a plurality of management nodes, there is a problem that communications traffic further increases.

That is, in the example depicted in FIG. 34, Nodes A to E in the system make a notification to the management node of contents held by each node when switched from a power-off state to a power-on state regardless of whether contents have been deleted or updated. The Node D makes a notification of the power-on state to each of management nodes of contents A and contents B. This increases communications traffic.

Further, according to the above-mentioned methods, the management node is always communicable. This is because, according to the method depicted in FIG. 33, the management node periodically transmits a deletion instruction or the like and according to the method depicted in FIG. 34, the management node always receives a notification of a node being turned on.

In a P2P mode system, however, there is no fixed server and any node may become a management node. Thus, it is preferable to assume that the management node may also become non-communicable.

Figure 35:
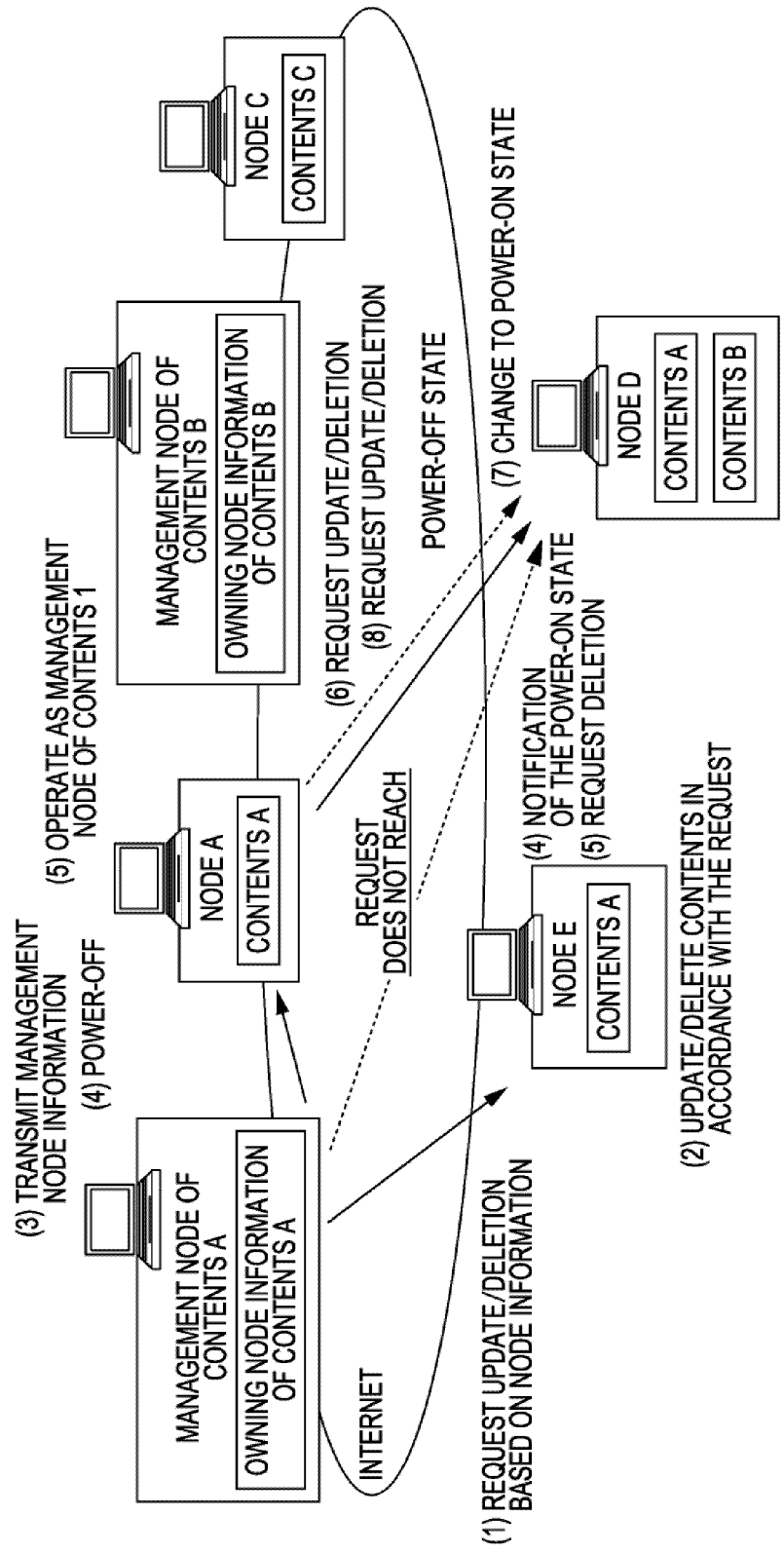
FIG. 35 is a diagram (Part 3) illustrating an example of the conventional deletion/update method of contents.

According to the method depicted in FIG. 35, the Node D may not recognize which node serves as the management node. Thus, the Node A, for example, preferably sends a notification to the Node D regularly.

An object of a disclosed contents deletion/update apparatus, contents deletion/update method, and contents deletion/update program is to provide a technology capable of efficiently performing deletion/updates of contents without increasing communications traffic in a P2P mode system in which an indefinite number of pieces of contents are in circulation also for nodes in a power-off state when a notification from the management node arrives to delete/update contents held by a plurality of nodes making up a system.

Preferred embodiments of the present invention will be described below in detail with reference to the drawings.

Figure 1:
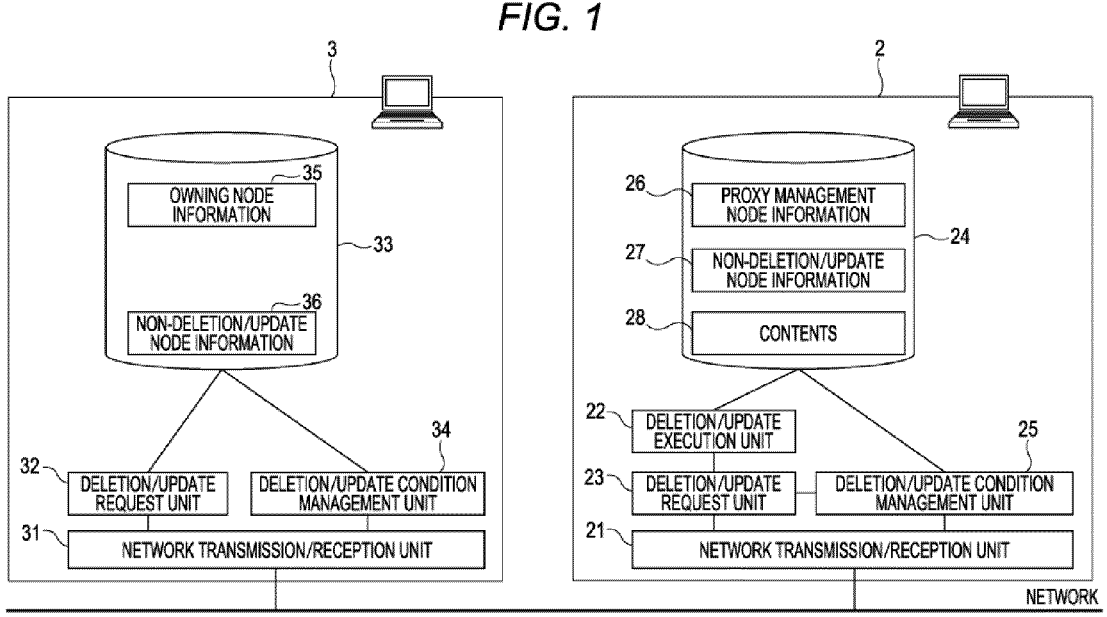
FIG. 1 is an example of a configuration of a P2P system.

FIG. 1 is an example of a configuration diagram of a disclosed P2P system. A disclosed P2P system 1 uses 'Bit-Torrent' or the like and a plurality of nodes 2 are mutually connected via a network such as the Internet. Each of the nodes 2 shares contents among the other nodes 2 by transmitting and receiving contents to and from the other nodes 2.

A management node 3 and the nodes 2 are typical personal computers (PCs) including a CPU (Central Processing Unit), storage such as a memory and HDD (hard Disk Drive), and a network interface. However, the management node 3 and the nodes 2 are not limited to PCs. The management node 3 and the nodes 2 may be an electrical appliance which may be connected to a network.

In the P2P system 1 using 'BitTorrent' or the like, the management node 3 exists for contents shared among the nodes 2. One node 2 among the plurality of nodes 2 operates as the management node 3 that manages the contents and holds information that describes the node 2 having the contents. Information that describes the node 2 having the contents is called "owning node information". The management node 3 exists for each piece of contents and holds owning node information about the contents.

FIG. 1 depicts an example of the configuration of the management node 3 that manages certain contents and one node 2 of nodes holding the contents.

The management node 3 includes a network transmission/reception unit 31, a deletion/update request unit 32, a storage unit 33, and a deletion/update condition management unit 34.

The network transmission/reception unit 31 of the management node 3 transmits and receives various kinds of information to and from the nodes 2 via a network. The deletion/update request unit 32 outputs a deletion request or update request of the contents to the nodes 2 via the network transmission/reception unit 31.

The storage unit 33 stores information about deletion or the like of the contents. The storage unit 33 stores owning node information 35, which is information about the node that owns the contents, and non-deletion/update node information 36.

The deletion/update condition management unit 34 manages deletion and update conditions of contents in the nodes 2 based on information stored in the storage unit 33.

The node 2 includes a network transmission/reception unit 21, a deletion/update execution unit 22, a deletion/update request unit 23, a storage unit 24, and a deletion/update condition management unit 25.

The network transmission/reception unit 21 transmits and receives various kinds of information to and from the management node 3 via a network. The deletion/update execution unit 22 performs processing to delete and update certain contents when a deletion request or update request is received from the management node 3 via the network transmission/reception unit 21.

The deletion/update request unit 23 outputs a deletion request or update request to delete contents from and/or update contents to the nodes 2 that are the other nodes 2 sharing contents and have not yet performed deletion or the like of the contents in accordance with the request from the management node 3.

The storage unit 24 stores information about both contents 28 and a deletion or the like of the contents 28. More specifically, the storage unit 24 includes the contents 28, proxy management node information 26, and non-deletion/update node information 27. The proxy management node information 26 stored in the storage unit 24 of the node 2 will be described later.

The deletion/update condition management unit 25 manages deletion and update conditions of contents in the nodes 2 other than the local node regarding the contents whose deletion and/or update is requested by the management node 3 based on information stored in the storage unit 24. As described above, the deletion/update condition management unit 25 manages deletion and update conditions of contents of the nodes 2 that have not yet deleted/updated contents in accordance with a request from the management node 3.

An example of the method of performing deletion and update of contents shared among the nodes 2 in a P2P system containing the management node 3 and the node 2 depicted in FIG. 1 will be described below.

First Embodiment

Figure 2:
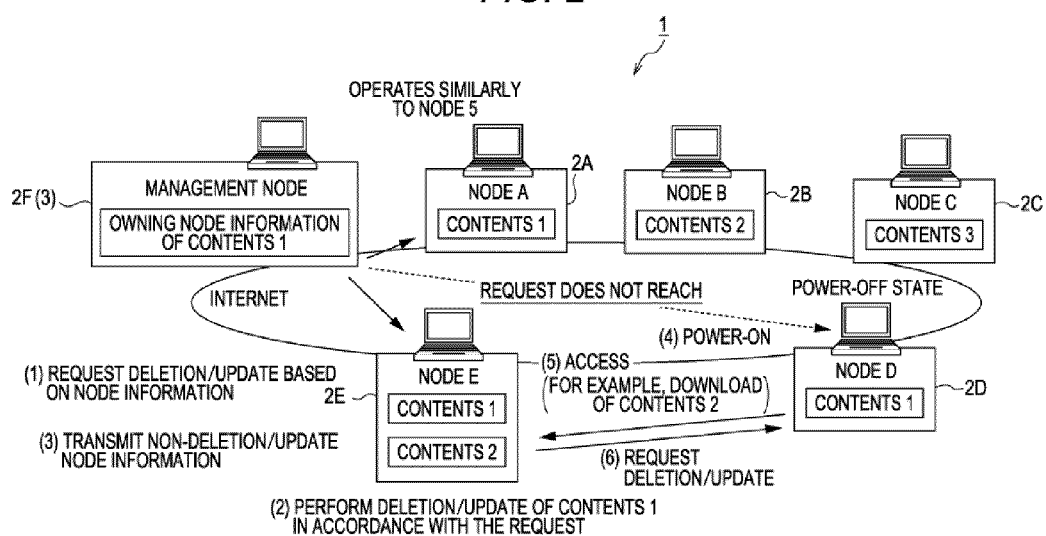
FIG. 2 is a diagram explaining an overview of a contents deletion/update method according to a first embodiment.

FIG. 2 is diagram explaining an overview of a contents deletion/update method according to the present embodiment. Here, a case in which six units of the node 2 (2A to 2F) are mutually connected via the Internet is taken as an example. When each node is described separately in the description below, symbols A to F are attached; otherwise, the symbols A to F are omitted.

As described above, the node 2 is a PC or a device connectable to a network.

A network interface is connected to a network and then, as depicted in FIG. 2, to the Internet. The connection from the network to the Internet is established similar to when the Internet is used in an ordinary manner through an ADSL (Asymmetric Digital Subscriber Line) modem, or the like. As depicted in FIG. 2, a plurality of nodes are connected to the Internet. In contrast to a server/client system, some node in a system called P2P may become a receiver of contents and also a deliverer of contents. Further, some node may become a management node of contents. For convenience of description, a node that owns (delivers) contents is denoted as an "owning node."

In the present embodiment, a node first accesses the management node in order to know which node has contents before the node receives the contents from an owning node. The address of the management node may be acquired, for example, by using a method of obtaining the address from a Web site that manages a list of management nodes through a Web browser.

The management node 3 provides, for example, owning node information as depicted in FIG. 3A and FIG. 3B in response to a request from the node 2. FIG. 3A is an example of the data structure of the owning node information 35 held by the management node 3. The management node 3 provides data in the format depicted in FIG. 3B to the node 2 based on the owning node information 35 held by the management node 3.

FIG. 3B depicts that a node having an IP (Internet Protocol) address described in the "ip attribute" of the "node" tag is an owning node of contents identified by ID (Identification) defined in the "contentid" attribute of the "nodes attribute". Therefore, contents identified by the contents ID=00000001 may be acquired by accessing one of three nodes described in FIG. 3.

Here, the IP address is used as a method of identifying the node, but any other method may also be used to identify the node. For example, a domain name may dynamically be assigned to an IP address by using the mechanism of DDNS (Dynamic DNS (Domain Name System)). By describing the domain name, instead of the IP address, which node is an owning node of certain contents may be depicted and the node may be accessed based on the domain name.

When data in the format depicted in FIG. 3B is received from the management node 3, the node 2 stores owning node information in the local machine based on the received data. The owning node information held by the node 2 has, for example, like the information held by the management node 3, the data structure depicted in FIG. 3A in which the contents ID and the IP address and port number of the node holding the contents identified by the contents ID are associated.

The node 2 may receive desired contents by accessing the owning node based on the owning node information depicted in FIG. 3B. The management node 3 determines that the accessing node 2 has received desired contents and describes information indicating the node in the owning node information 35 held by the management node 3.

The method of deleting contents or the like according to the present embodiment in the aforementioned delivery system of contents will be described below.

An example of the operation procedure for the management node and a node holding contents when, for example, an instruction to delete or update contents is input by a user such as a provider of the contents 1 will be described. (Procedure 1) to (Procedure 6) in the description below correspond to (1) to (6) in FIG. 2 respectively.

In the configuration example depicted in FIG. 2, Node 2F is the management node 3 for the contents 1. As described above, the management node 3 (Node 2F) holds the owning node information 35 depicted in FIG. 3A, that is, the owning node information 35 indicating the node 2 holding the contents 1.

(Procedure 1)

First, the management node 3 of the contents 1 transmits a deletion request or update request to each of the Nodes 2A, 2D, and 2E based on the owning node information 35 of the contents 1. FIG. 4 depicts examples of a deletion request and an update request. A deletion request specifies a contents ID which identifies contents and instructs the node 2 that has received the request to delete the specified contents. An update request specifies a contents ID and a version of the contents and instructs the node 2 that has received the request to update the specified contents to the specified version.

(Procedure 2)

The Nodes 2A and 2E that have received the request from the management node 3 send back a response to the management node 3 and also perform deletion of the contents 1 or the like in response to the received request. If a deletion request is received, the Nodes 2A and 2E delete the specified contents. If an update request is received, the Nodes 2A and 2E access the management node 3 to acquire contents to update the specified contents. In contrast, the Node 2D is in a power-off state when the deletion request is transmitted from the management node 3 and thus receives no request. Therefore, transmission of a response to the management node 3 and deletion of the contents 1 or the like are not performed by the Node 2D.

(Procedure 3)

The management node 3 receives a response to the deletion request or the like transmitted in Procedure 1 from each of the Nodes 2A and 2E. The management node 3 creates information indicating nodes from which no response has been received based on received responses. Information indicating nodes from which no response has been received is called "non-deletion/update node information".

FIG. 5A is an example of the data structure of the non-deletion/update node information 36 created by the management node 3, and FIG. 5B is a format example of communication data of non-deletion/update node information transmitted to the node 2. As depicted in FIG. 5, a node identified by the "ip attribute" of the "node tag" means a node that has not deleted the contents. In the example depicted in FIG. 5, the Node 2D of the IP address "192.168.1.4" and the port number "10000" has not deleted the contents of the contents ID=00000001 in response to a deletion request.

The Nodes 2A and 2E associate the contents ID and the node information (the IP address and port number in the present embodiment) identifying the node 2 based on the received data and cause a storage unit of the local machine to store the information as the non-deletion/update node information 27.

(Procedure 4)

The node 2D is switched from a power-off state to a power-on state.

(Procedure 5)

After being switched to the power-on state, the Node 2D accesses another node 2 in the network, the Node 2E in the example in FIG. 2. Here, access to the other Node 2 means, for example, accessing another node in the network to download contents 2 or the like.

(Procedure 6)

The Node 2E that has been accessed by another node references the non-deletion/update node information 27 held by the Node 2E. As described above, the non-deletion/update node information 27 has the IP address and port number indicating the Node 2D that has access the Node 2E by being associated with the contents ID indicating the contents 1 stored therein. Accordingly, the Node 2E determines that it is necessary for the Node 2D to perform deletion of the contents 1 or the like and transmits a request to perform deletion of the contents 1 or the like to the Node 2D. At this point, the Node 2E may delete information indicating the node 2D from the non-deletion/update node information 27 held by the Node 2E.

The same communication message as that of a request transmitted from the management node 3 to each of the nodes 2 may be used as the request transmitted from the Node 2E to the Node 2D. The Node 2D performs deletion of the contents 1 or the like in accordance with the request received from the Node 2E.

Figure 6:
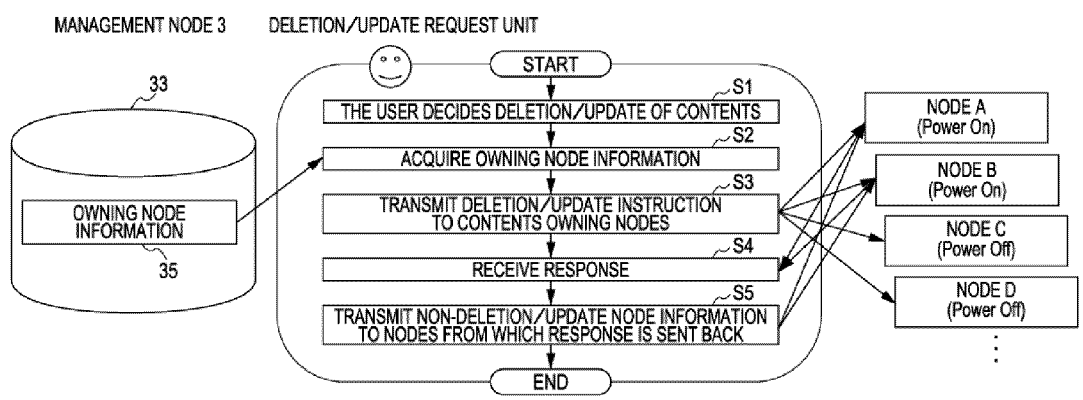
FIG. 6 is an operation chart depicting an example of processing concerning deletion/update of contents in a management node according to the first embodiment.

FIG. 6 is an operation chart depicting processing concerning deletion and update of contents in the management node 3.

First, at operation S1, a user such as a provider of the contents decides to delete and/or update contents and inputs an instruction to delete or update the contents. At operation S2, the management node 3 acquires the owning node information 35 related to the contents. Then, at operation S3, the management node 3 transmits a deletion and/or update instruction to the nodes 2 indicated by the owning node information 35.

After receiving a response from each of the nodes 2 at operation S4, the management node 3 transmits, at operation S5, non-deletion/update node information indicating nodes (Nodes C and D) that have not sent back a response to the nodes 2 (Nodes A and B) that have sent back a response before terminating the processing.

In transmitting non-deletion/update node information at operation S5, if all nodes send back a response, that is, there is no node that has not sent back a response, the non-deletion/update node information may not be transmitted or a blank message may be transmitted.

Figure 7:
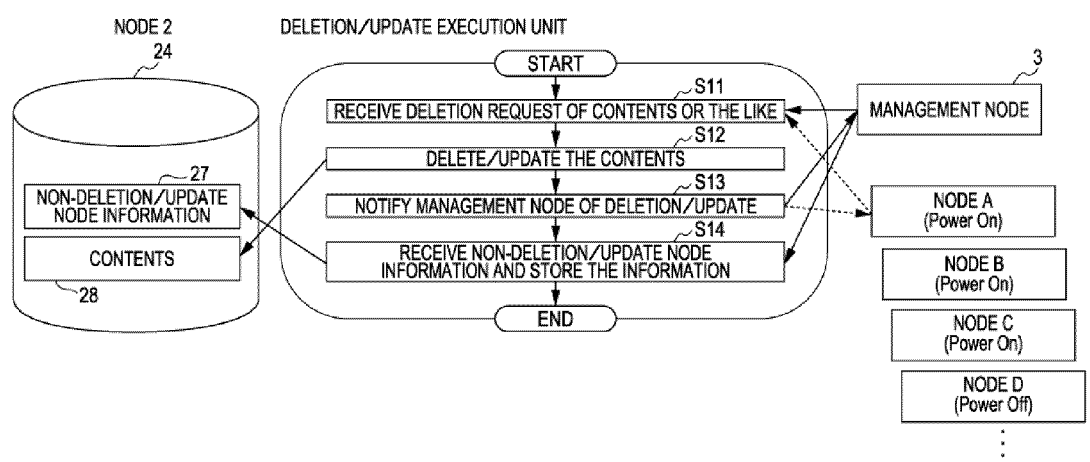
FIG. 7 is an operation chart depicting an example of processing that performs deletion or the like of contents in a node according to the first embodiment.
Figure 8:
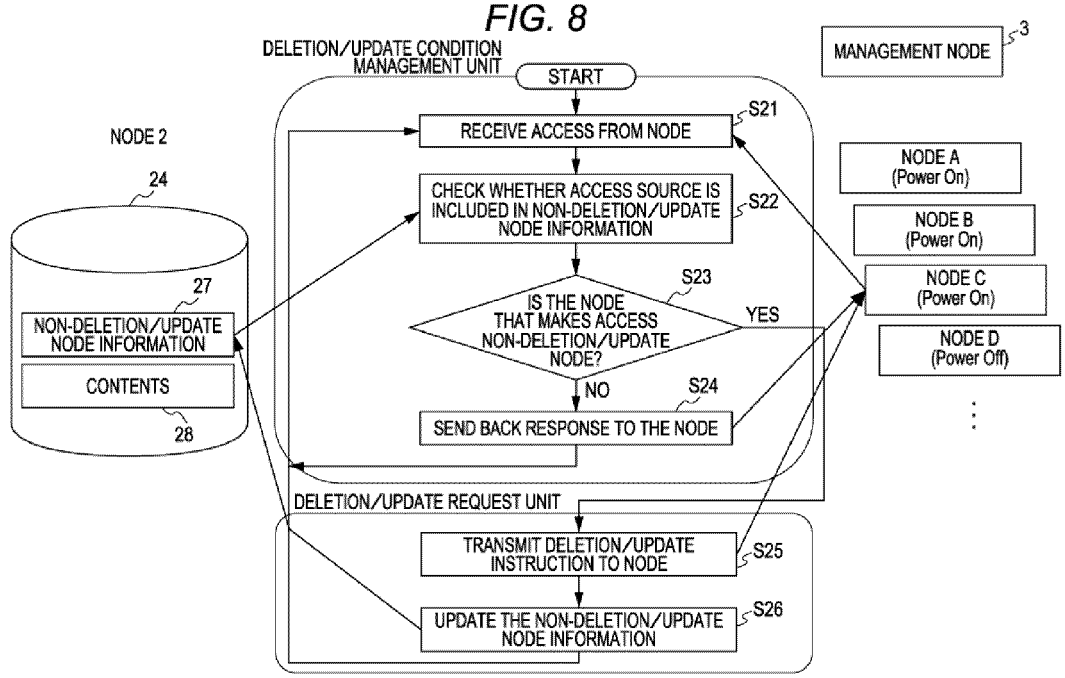
FIG. 8 is an operation chart depicting an example of processing performed in response to access from another node in the node according to the first embodiment.

FIG. 7 and FIG. 8 are operation charts depicting examples of processing in the node 2. As the above processing, FIG. 7 is an operation chart depicting an example of processing to perform deletion of contents or the like in the node 2.

First at operation S11 in FIG. 7, a deletion request regarding certain contents or the like is received from the management node 3, and at operation S12, the node 2 performs deletion of the contents or the like in accordance with the received request. At operation S13, the node 2 sends back a response to the management node 3 to notify the management node 3 that the deletion of the contents or the like has been performed. At operation S14, the node 2 receives non-deletion/update node information from the management node 3 and causes the local machine to store the information before terminating the processing.

FIG. 8 is an operation chart depicting an example of processing performed in response to access from another node 2 in the node 2 according to the first embodiment.

If accessed from another node 2 at operation S21, the node 2 references, at operation S22, the non-deletion/update node information 27 to check whether information indicating the access source node 2 is stored.

At operation S23, the node 2 judges whether the node 2 that has made access is a node (assumed to be a non-deletion/update node) that has not performed deletion of contents or the like. If the node 2 is not a non-deletion/update node, processing continues to operation S24 and a response is sent back to the node 2 that has made access before returning to operation S21.

If it is judged at operation S23 that the node 2 that has made access is a non-deletion/update node, processing continues to operation S25. Then, the node 2 transmits a deletion instruction or the like to the node 2 that has made access and deletes, at operation S26, information indicating the node 2 that has made access from the non-deletion/update node information 27 before returning to operation S21. Subsequently, the same processing is repeated.

According to the contents deletion/update method in the present embodiment, as described above, the management node 3 determines the nodes 2 that have not performed deletion of contents or the like based on the presence or absence of a response to a deletion request or the like transmitted to each of the nodes 2. The management node 3 creates non-deletion/update node information indicating nodes that have not performed deletion of contents or the like and transmits the information to the nodes 2 that have sent back a response. If the node 2 that was in a power-off state when a deletion request of certain contents or the like was transmitted and then switched to a power-on state accesses the node 2 that has received the non-deletion/update node information from the management node 3, the node 2 transmits a deletion request or the like to the node 2 that has made access.

Thus, even if a node in a power-off state is present in a network, another node sharing contents transmits a deletion request or the like to the node that has made access based on the non-deletion/update node information. That is, when the non-deletion/update node information is received from the management node 3, the node 2 is considered to be entrusted by the management node 3 to transmit a deletion request of the contents or the like. Then, in place of the management node 3, the node 2 transmits a deletion request or the like to nodes that have not performed deletion or the like. In contrast to an ordinary server, the node 2 holding contents in a P2P system is frequently turned off when the node 2 is not used. Even in such an environment, including the above configuration makes regular transmission of a deletion request or the like by the management node 3 and a notification made by each of the nodes 2 when switched from a power-off state to a power-on state unnecessary.

The above configuration includes transmission of a deletion request or the like from the nodes 2 that have performed deletion or the like when a non-deletion/update node accesses the nodes 2 that have performed deletion/update of contents or the like, but the configuration is not limited to this. The configuration may include similar processing performed by the management node 3 when a non-deletion/update node accesses the management node 3.

Second Embodiment

The second embodiment is different from the above embodiment in that whether the node 2 that has sent back a response may be entrusted to transmit a deletion request or the like is judged and, based on a judgment result, the node 2 is entrusted with processing such as transmission of a deletion request or the like.

The configuration of a system, information held by the node 2 and the management node 3, and transmitted/received information are the same as those in the above embodiment and thus, a description thereof is omitted. The description of the second embodiment focuses on differences of the contents deletion/update method from that according to the first embodiment.

Figure 9:
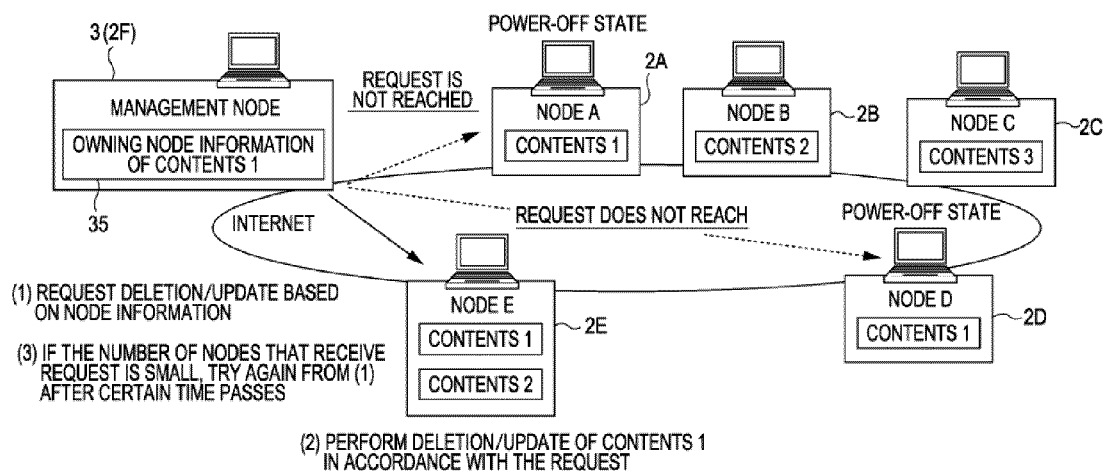
FIG. 9 is a diagram explaining an overview of the contents deletion/update method according to a second embodiment.

FIG. 9 is a diagram explaining an overview of the contents deletion/update method according to the present embodiment. The configuration of a system is like the above embodiment. The procedure for deleting/updating contents in the present embodiment will be described with reference to FIG. 9.

(Procedure 1)
Like Procedure 1 in FIG. 2, the management node 3 of the contents 1 transmits deletion request and/or update requests to the Nodes 2A, 2D, and 2E indicated by the owning node information 35.

(Procedure 2)
The nodes 2 in a power-on state delete or update the contents 1 in accordance with the request. The nodes 2 also send back a response to the management node 3. In the example in FIG. 9, among the three Nodes 2A, 2D, and 2E indicated by the owning node information, only one node is in a power-on state and the Nodes 2A and 2D are in a power-off state. Thus, only one node 2 among the three nodes sends back a response to the management node 3.

(Procedure 3)
The management node 3 determines whether the nodes 2 that have sent back a response should be entrusted to make a deletion request or the like based on whether the number of nodes that have sent back a response satisfies given conditions. In the example in FIG. 9, as described above, only one node of the three nodes has sent back a response. Thus, the management node 3 determines that it is more efficient to transmit a deletion request or the like to the node 2E by the management node 3 itself, instead of entrusting the Node 3E with processing, such as transmission of a deletion request of contents, and thus, the Node 2E is not entrusted with processing.

If the node 2 is not entrusted with processing such as transmission of a deletion request, the management node 3 retransmits a deletion request or the like to the Nodes 2A and 2D that have not performed deletion of contents or the like when a given period passes after transmitting the deletion request or the like to the Nodes 2A, 2D, and 2E in Procedure 1.

If it is determined in Procedure 3 to entrust the node 2 with transmission of a deletion request or the like, deletion of contents or the like is performed according to the procedure of Procedure 3 and thereafter in FIG. 2.

Figure 10:
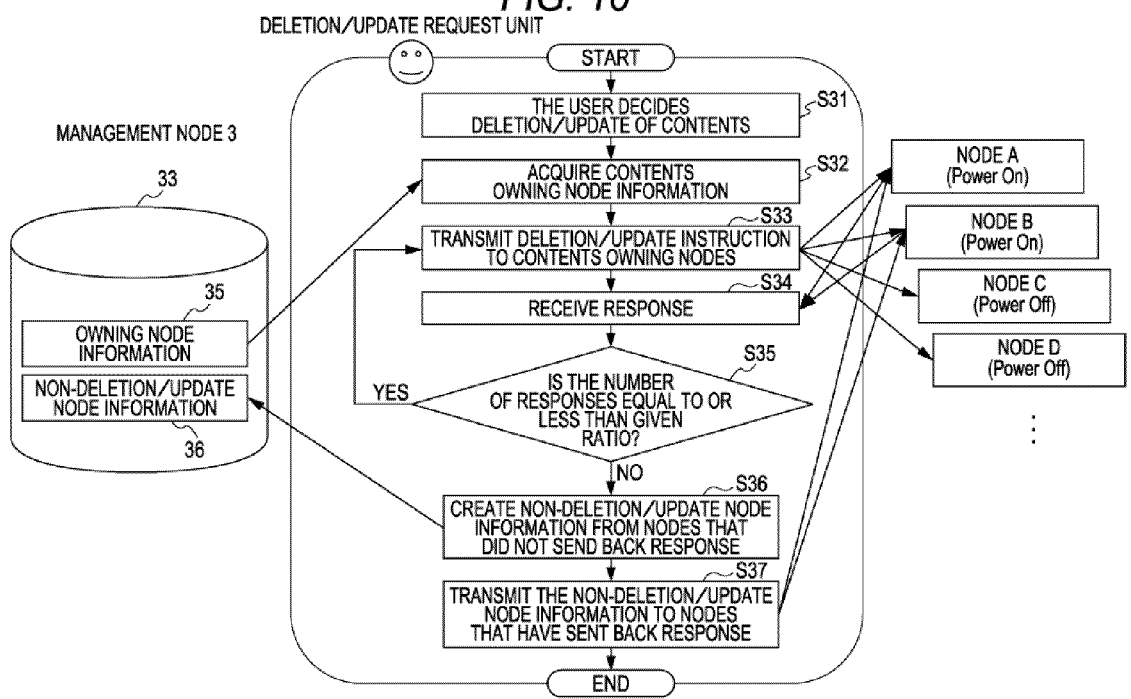
FIG. 10 is an operation chart depicting an example of processing concerning deletion/update of contents in the management node according to the second embodiment.

FIG. 10 is an operation chart depicting an example of processing concerning deletion and update of contents in the management node 3.

A sequence of processing from operation S31 to operation S34 depicted in FIG. 10 corresponds to processing from operation S1 to operation S4 in FIG. 6 respectively. In the present embodiment, whether the number of received responses is equal to or less than a given ratio is judged at operation S35, which makes the flow chart different from that in FIG. 6.

As described with reference to FIG. 9, if the number of responses (number of the nodes 2 that have sent back a response) is small, retransmitting a deletion request or the like by the management node 3 itself is considered to be more efficient than entrusting the node 2 with transmission of a deletion request or the like. Thus, if it is judged at operation S35 that the number of responses is equal to or less than a given ratio, processing returns to operation S33 to retransmit the deletion request or the like after a given period passes.

If it is judged at operation S35 that the number of responses exceeds a given ratio, processing proceeds to operation S36. At operation S36, non-deletion/update node information indicating the nodes 2 that have not sent back a response is created and the management node 3 causes the local machine to store the non-deletion/update node information. Then, at operation S37, the created non-deletion/update node information is transmitted to the nodes 2 that have sent back a response before processing being terminated.

In the above description, whether the management node 3 retransmits a deletion request or the like is judged based on whether the number of responses is equal to or less than a given ratio, but the present embodiment is not limited to this. For example, a judgment may be made based on whether the number of responses is equal to or less than a given threshold.

According to the contents deletion/update method in the present embodiment, as described above, nodes are entrusted with transmission of a deletion request or the like if the ratio of nodes that have performed deletion and/or update of contents in response to a request of contents deletion/update from the management node 3 is equal to or larger than a given value (or the number of nodes that have performed deletion of contents or the like is larger than a given value). If nodes to be entrusted do not satisfy certain conditions, nodes are not entrusted and the management node 3 retransmits a deletion request or the like. Accordingly, contents may be deleted or updated more efficiently.

Third Embodiment

The present embodiment is different from the above embodiments in that when deletion of contents or the like is performed in accordance with a deletion request or update request from the node 2 entrusted by the management node 3, the node 2 that has transmitted the deletion request or the like updates the non-deletion/update node information held by the node 2.

Also in the present embodiment, the configuration of a system, information held by the node 2 and the management node 3, and transmitted and received information are the same as those in the above embodiment and thus, a description thereof is omitted. Here, the description focuses on differences of the contents deletion/update method from that according to the above embodiments.

Figure 11:
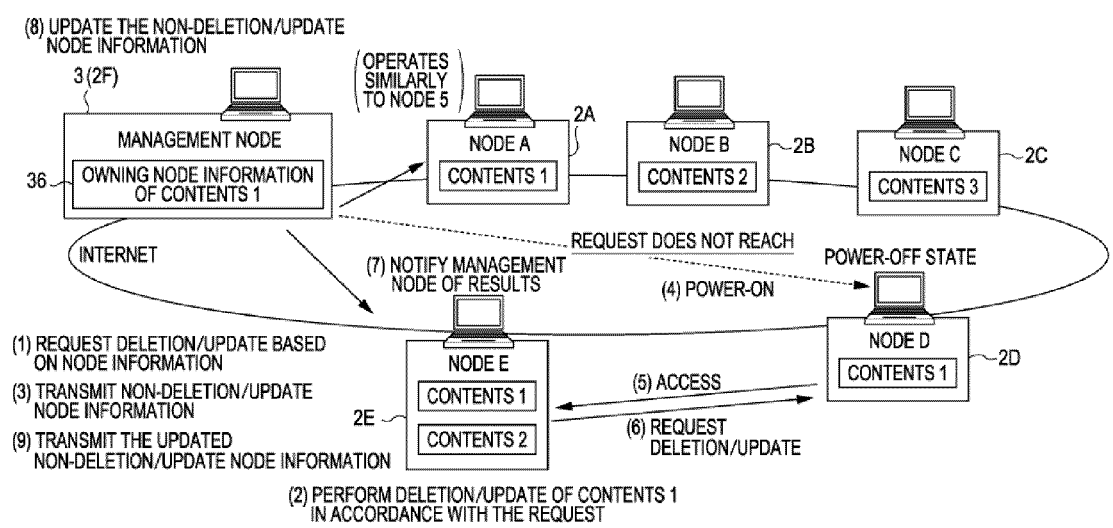
FIG. 11 is a diagram explaining an overview of the contents deletion/update method according to a third embodiment.

FIG. 11 is a diagram explaining an overview of the contents deletion/update method according to the present embodiment. The configuration is like the above embodiments. The procedure for deleting/updating contents in the present embodiment will be described with reference to FIG. 9.

Procedure 1 to Procedure 6 are similar to Procedure 1 to Procedure 6 in FIG. 2 and thus, a description thereof is omitted, and Procedure 7 and subsequent procedures will be described.

(Procedure 7)
When the Node 2E, which has transmitted a deletion request/update request of the contents 1 to the Node 2D, receives a response to the deletion request or the like from the Node 2D, the Node 2E notifies the management node 3 of a result thereof. FIG. 12 is a format example of data sent to the management node 3. By receiving a notification in the format depicted in FIG. 12, the management node 3 recognizes that the contents ID=00000001, that is, the contents 1 has been deleted in the Node 2D identified by the "ip attribute" of the "node" tag.

(Procedure 8)
When a notification is received from the Node 2E entrusted with transmission of a deletion request or the like, the management node 3 updates the held non-deletion/update node information 36 based on the received notification. The management node 3 deletes information indicating the Node 2E from the non-deletion/update node information 36.

(Procedure 9)
The management node 3 transmits the non-deletion/update node information after being updated to the nodes 2. The nodes 2 to which the information is transmitted is described in the owning node information 35 excluding nodes indicated in the non-deletion/update node information 36 after being updated.

Here, if the nodes 2 to which the information is transmitted are all the nodes 2 described in the owning node information 35, the management node 3 may not transmit the non-deletion/update node information 36 by determining that the contents have been deleted/updated in all the nodes 2 sharing the contents.

Figure 13:
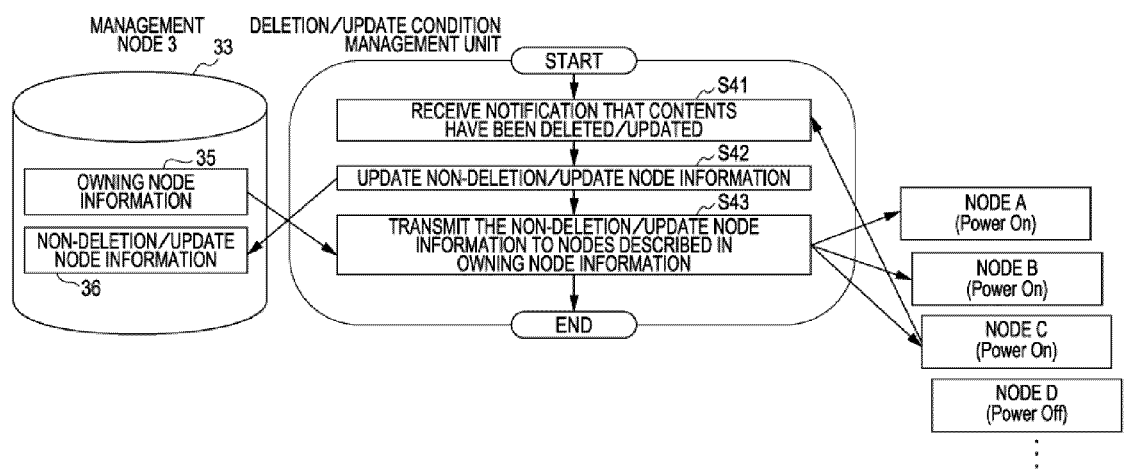
FIG. 13 is an operation chart depicting an example of processing concerning deletion/update of contents in the management node according to the third embodiment.

FIG. 13 is an operation chart depicting an example of processing concerning deletion and/or update of contents in the management node 3. A sequence of processing depicted in FIG. 13 is performed after processing from operation S1 to S5 in FIG. 6 has been performed and corresponds to Procedure 7 and subsequent procedures.

First, at operation S41, the management node 3 receives a notification that contents have been deleted and/or updated in a node in which the contents were not deleted and/or updated from the entrusted node 2.

At operation S42, the management node 3 updates the non-deletion/update node information 36 held by the management node 3 based on the notified contents. A concrete method of updating is as described with reference to FIG. 11.

At operation S43, the management node 3 transmits the updated non-deletion/update node information 36 to nodes described in the contents owning node information 35 excluding nodes indicated in the non-deletion/update node information 36 before terminating processing.

Figure 14:
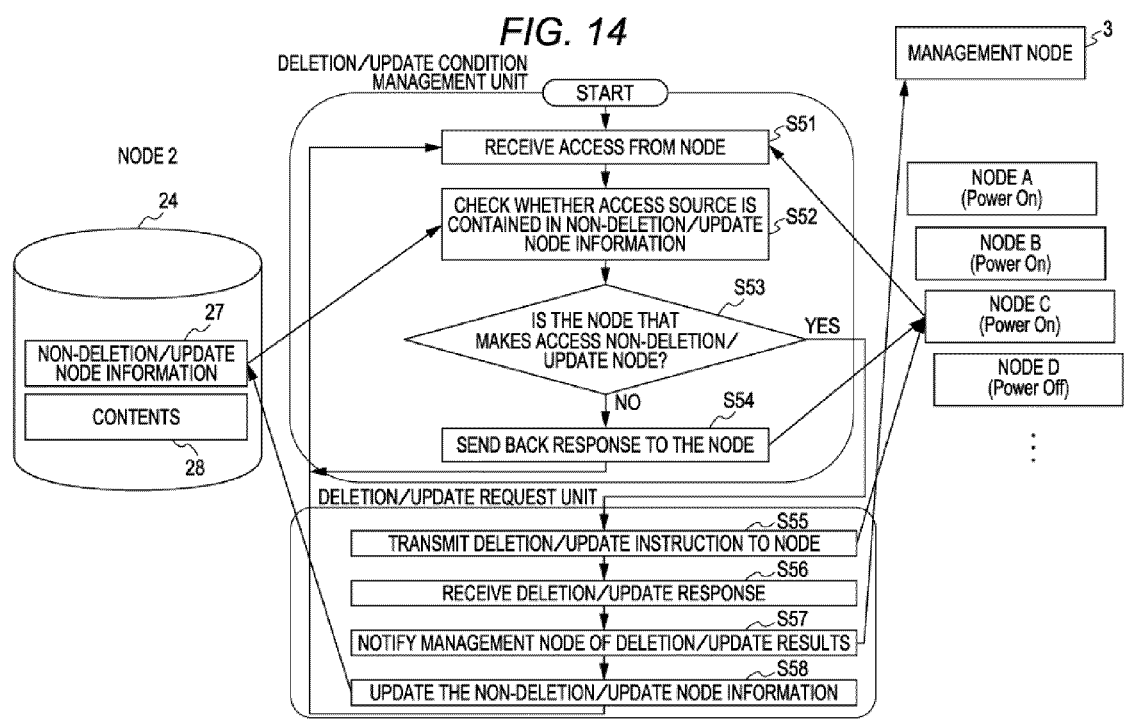
FIG. 14 is an operation chart depicting an example of processing performed in response to access from another node in the node according to the third embodiment.

FIG. 14 is an operation chart depicting an example of processing performed in the node 2 in response to access from another node 2. Operation S51 to operation S55 of processing in FIG. 14 correspond to operation S21 to operation S25 of processing in FIG. 8 respectively. At operation S55, the node 2 transmits a deletion and/or update request to the other node 2 that has made access before continuing to operation S56.

At operation S56, the node 2 receives a response to the deletion and/or update request from the other nodes 2 and notifies, at operation S57, the management node 3 of a deletion and/or update result. At operation S58, the node 2 updates the non-deletion/update node information 27 held by the local machine. The node 2 deletes the other nodes 2 that have made access from the non-deletion/update node information 27 before returning to operation S51.

As described above, the management node 3 updates the non-deletion/update node information based on a notification from the node 2 at operation S57 in FIG. 14 and transmits the information to owning nodes after being updated.

Figure 15:
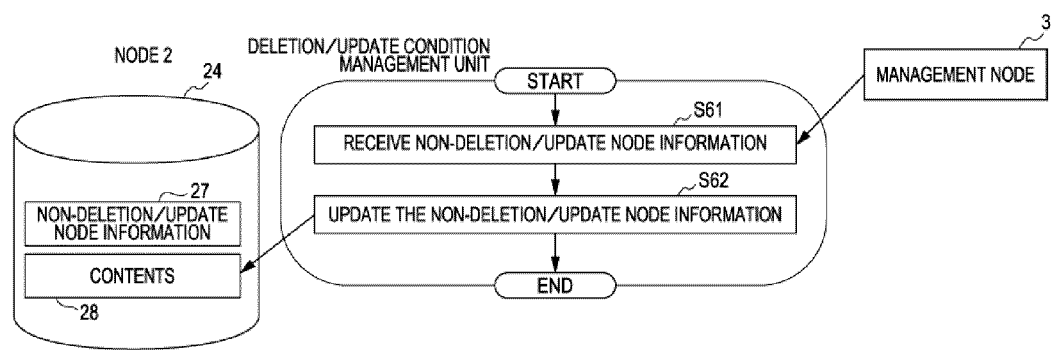
FIG. 15 is an operation chart depicting an example of update processing of non-deletion/update node information in the node according to the third embodiment.

FIG. 15 is an operation chart depicting an example of update processing of the non-deletion/update node information 27 in the node 2.

When the non-deletion/update node information 27 is received from the management node 3 at operation S61, each of the nodes 2 updates, at operation S62, the non-deletion/update node information 27 held by each of the nodes 2 based on the received information.

Thus, according to the contents deletion/update method in the present embodiment, information about a node that has performed deletion of contents or the like by accessing the node 2 entrusted by the management node 3 is deleted. A deletion request or the like is transmitted to a node that has not performed deletion of contents or the like from a plurality of the nodes 2 holding the non-deletion/update node information, effectively preventing wasteful processing from arising.

Fourth Embodiment

In the third embodiment, the management node 3 updates the non-deletion/update node information 27 and transmits the updated information to each of the nodes 2. In contrast, the present embodiment is different in that the node 2 updates the non-deletion/update node information 27 and the node makes a notification to other nodes holding the non-deletion/update node information 27.

Also in the present embodiment, the configuration of a system and information held by the node 2 and the management node 3 are the same as those in the third embodiment and thus, a description thereof is omitted and the description will focus on differences.

Figure 16:
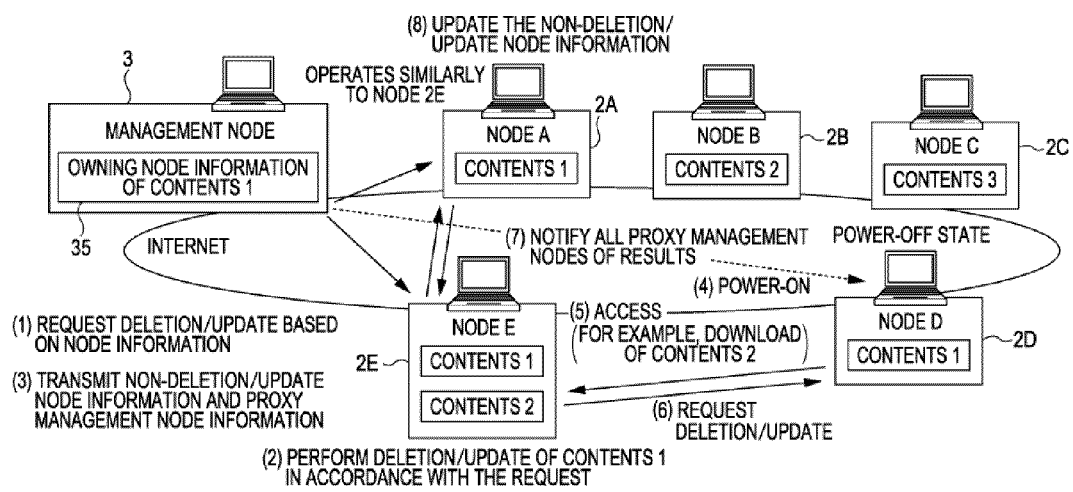
FIG. 16 is a diagram explaining an overview of the contents deletion/update method according to a fourth embodiment.

FIG. 16 is a diagram explaining an overview of the contents deletion/update method according to the present embodiment. The configuration is like the above embodiments. Procedure 1 and Procedure 2 in FIG. 16 are similar to Procedure 1 and Procedure 2 in FIG. 2 or FIG. 11 respectively. Here, Procedure 3 and subsequent procedures will be described.

(Procedure 3)

The management node 3 transmits proxy management node information 26 as well as the non-deletion/update node information 27 to the Nodes 2A and 2E that are owning nodes of the contents 1 and have sent back a response to a deletion/update request. A proxy management node described in the proxy management node information is a node among contents owning nodes that manage, in place of the management node 3, the non-deletion/update node information 27 indicating other nodes that have not yet performed deletion and/or update of the contents. When a node indicated in the non-deletion/update node information 27 performs deletion of contents or the like, the node 2 that serves as a proxy management node deletes the node from the non-deletion/update node information.

FIG. 17A is a format example of proxy management node information 26 transmitted from the management node 3 to the node 2 and FIG. 17B is an example of the data structure of proxy management node information 26 held by the node 2.

As depicted in FIGS. 17A and 17B, the proxy management node information 26 has information indicating, among nodes owning contents, nodes that have performed deletion and/or update in response to a request from the management node 3, that is, nodes excluding the nodes 2 indicated in the non-deletion/update node information 27 stored therein.

Procedure 4 to Procedure 6 are similar to Procedure 4 to Procedure 6 in FIG. 2 respectively.

(Procedure 7)

The Node 2E notifies the Node 2A, which is the other proxy management node, that a response to a deletion and/or update request is received from the Node 2D. Though omitted in FIG. 16, after receiving the response from the Node 2D, the Node 2E updates the non-deletion/update node information 27 held by the Node 2E and deletes information indicating the Node 2D from the non-deletion/update node information 27.

(Procedure 8)

After receiving a notification from the Node 2E, the Node 2A updates the non-deletion/update node information 27 held by Node 2A based on the notification. The Node 2A deletes information indicating the Node 2D that has performed deletion and/or update of the contents 1 from the non-deletion/update node information 27.

Figure 18:
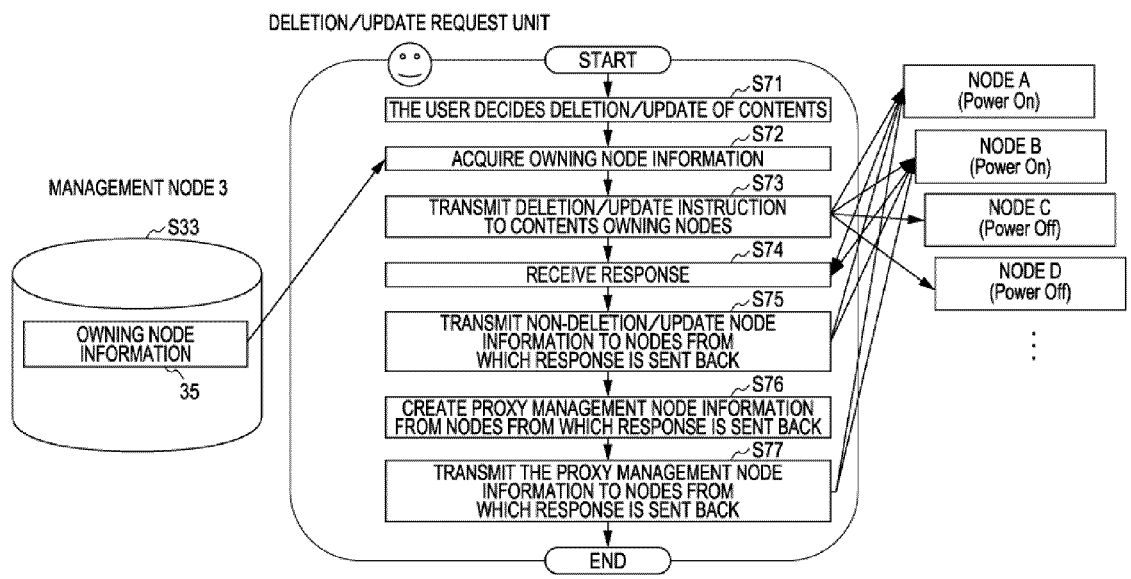
FIG. 18 is an operation chart depicting an example of processing concerning deletion/update of contents in the management node according to the fourth embodiment.

FIG. 18 is an operation chart depicting an example of processing concerning deletion and/or update of contents in the management node 3. A sequence of processing at operations S71 to S75 depicted in FIG. 18 is similar to processing at operations S1 to S5 in FIG. 6 respectively. Here, processing at operation S76 and thereafter will be described.

At operation S76, the management node 3 creates proxy management node information 26 based on the received response to a deletion and/or update request. Then, at operation S77, the management node 3 transmits the proxy management node information 26 to the nodes 2 that have sent back a response before terminating processing.

Figure 19:
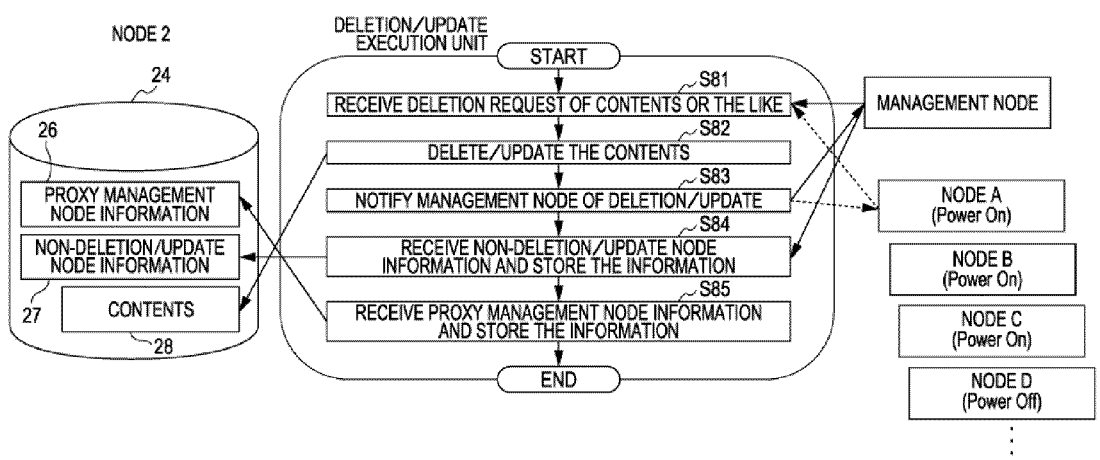
FIG. 19 is an operation chart depicting an example of processing concerning deletion/update of contents in the node according to the fourth embodiment.

FIG. 19 is an operation chart depicting an example of processing concerning deletion/update of contents in the node 2. A sequence of processing from operation S81 to operation S84 depicted in FIG. 19 is similar to processing from operation S11 to operation S14 in FIG. 7 respectively.

At operation S85, the node 2 receives the proxy management node information 26 from the management node 3 and stores the information in the node 2 before terminating processing.

Figure 20:
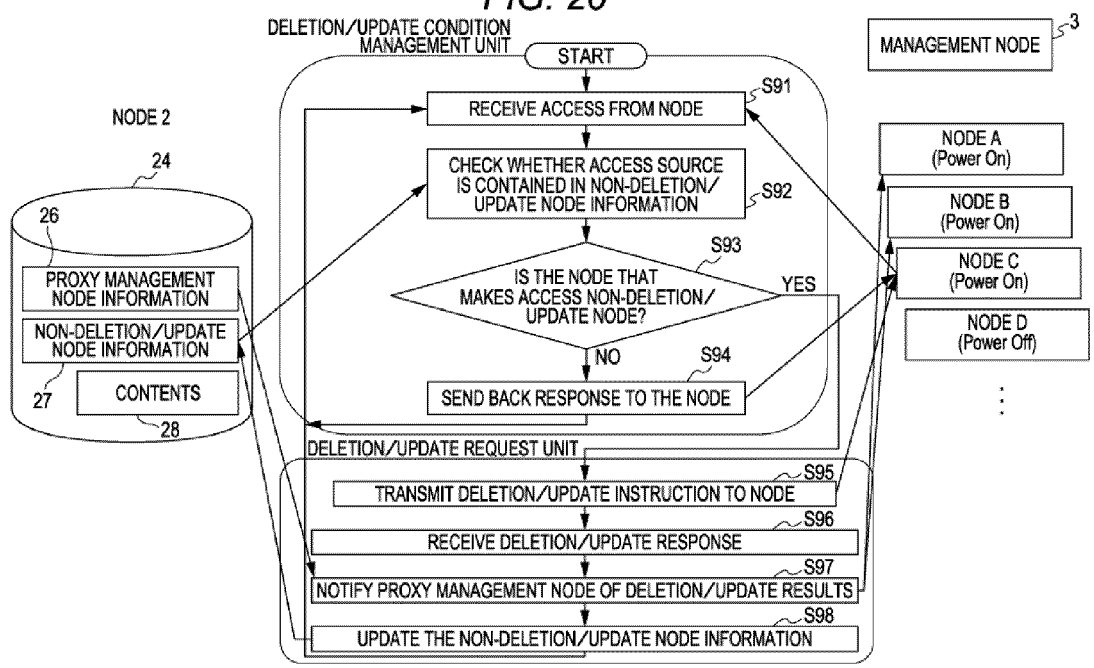
FIG. 20 is an operation chart depicting an example of processing performed in response to access from another node in the node according to the fourth embodiment.

FIG. 20 is an operation chart depicting an example of processing performed in the node 2 in response to access from another node 2 that has received the non-deletion/update node information 27 and the proxy management node information 26.

A sequence of processing from operation S91 to operation S95 depicted in FIG. 20 is similar to processing from operation S21 to operation S25 in FIG. 8 respectively.

At operation S96, the node 2 receives a response from another node that has made access and notifies, at operation S97, a node indicated by the proxy management node information 26 of a deletion and/or update result of the contents of the node that has made access based on the received response. Then, at operation S98, like operation S26 in FIG. 2, the node 2 updates the non-deletion/update node information 27 held by the node 2 and deletes information indicating the other node 2 that has made access before returning to operation S91.

Figure 21:
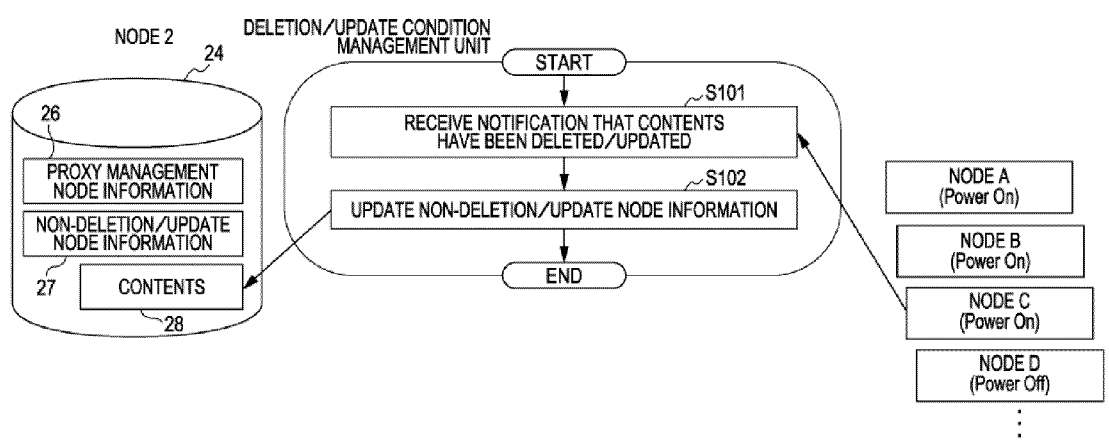
FIG. 21 is an operation chart depicting an example of update processing of non-deletion/update node information in the node according to the fourth embodiment.

FIG. 21 is an operation chart depicting update processing of non-deletion/update node information 27 in the node 2 entrusted by the management node 3. Processing depicted in FIG. 21 is performed by, among the plurality of nodes 2 that have received the proxy management node information 26, nodes excluding nodes that have performed processing depicted in FIG. 20.

At operation S101, the node 2 receives a notification that a node indicated in the non-deletion/update node information 27 has performed deletion and/or update of the contents from the other node 2 holding the proxy management node information 26. At operation S102, the node 2 updates the non-deletion/update node information 27 held by the node 2 and deletes information indicating the node that has performed deletion of the contents or the like according to the notified contents before terminating processing.

According to the contents deletion/update method in the present embodiment, as described above, when the management node 3 transmits non-deletion/update node information 27 to nodes, the management node 3 transmits proxy management node information 26 indicating a node to receive transmitting. The node that has received the non-deletion/update node information 27 and proxy management node information 26 stores the information in the node. If the node 2 indicated in the non-deletion/update node information 27 accesses the node 2 holding the proxy management node information 26, the node 2 indicated in the non-deletion/update node information is caused to perform deletion of the contents or the like and other proxy management nodes are notified of a result of deletion of the contents or the like of the node that has made access. In each node holding the proxy management node information, information indicating the node that has made access is deleted from the non-deletion/update node information.

In a P2P system, any node may become a management node. Thus, it is preferable that deletion and/or update of contents is not affected by any specific node in a system being switched to a power-off state. According to the contents deletion/update method in the present embodiment, non-deletion/update node information 27 is updated by each node at any time and thus, deletion/update of contents may be performed smoothly even if the management node 3 is in a power-off state.

In the foregoing, a case in which the node 2 is operated as a proxy management node with respect to the contents deletion/update method according to the first embodiment, but the present embodiment is not limited to this. For example, like the method according to the second embodiment, when the nodes 2 exceeding a given ratio send back a response to the management node 3, one of the nodes 2 that has sent back a response may be caused to operate as a proxy management node. Alternatively, like the method according to the third embodiment, a method of updating non-deletion/update node information 27 at the node 2 may be combined.

Fifth Embodiment

The present embodiment includes presetting conditions for stopping the contents deletion/update method according to the above embodiments and stopping transmission processing of a deletion request or the like entrusted to the node 2 by the management node 3 when stop conditions are satisfied. The configuration of a system and information held by the node 2 and the management node 3 are the same as those in the above embodiments and thus, a description thereof is omitted and the description will focus on differences.

The contents deletion/update method will be described below by comparing with that in the fourth embodiment, that is, the method of deleting and/or updating contents using the node 2 as a proxy management node.

When the management node 3 transmits non-deletion/update node information 27 to the node 2, the management node 3 also transmits stop conditions for transmission of a delete/update request in the node 2. Excluding transmission of stop conditions together with non-deletion/update node information 27, processing performed by the management node 3 and the like is, for example, as depicted in FIG. 18.

When the node 2 that has received stop conditions is accessed by a node indicated in the non-deletion/update node information 27, the node 2 judges whether stop conditions are satisfied. Then, if stop conditions are satisfied, the node 2 that has received stop conditions does not transmit a deletion and/or update request. A period, for example, is used as stop conditions.

FIG. 22 is a format example of non-deletion/update node information 27 and stop conditions transmitted from the management node 3 to the node 2. In the last line of the format depicted in FIG. 22, "Oct. 29, 2007" is described.

When the node 2 that has received information depicted in FIG. 22 is accessed by the node 2 indicated in the non-deletion/update node information 27, the node 2 compares the date of the access with the date indicated by stop conditions. If the date of the access is more recent than the date indicated by stop conditions, the node 2 that has received the information does not transmit a deletion and/or update request to the node 2 that has made access.

Figure 23:
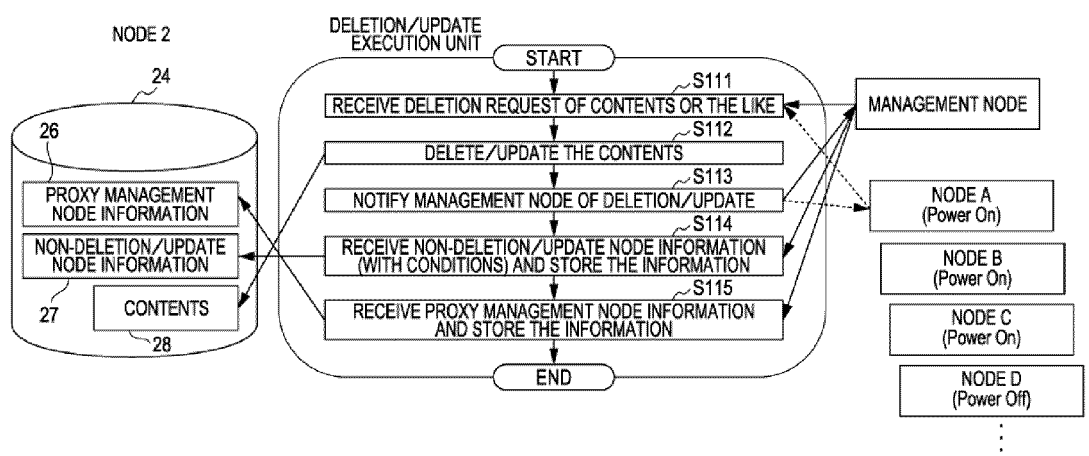
FIG. 23 is an operation chart depicting an example of processing concerning deletion/update of contents in the node according to a fifth embodiment.

FIG. 23 is an operation chart depicting an example of processing concerning deletion and/or update of contents in the node 2. Processing from operation S111 to operation S113 depicted in FIG. 23 is similar to processing from operation S81 to operation S83 in FIG. 19 respectively.

At operation S114, the node 2 receives the non-deletion/update node information 27 with stop conditions attached from the management node 3 and stores the received information in the node 2. At operation S115, like operation S85 in FIG. 19, the node 2 receives the proxy management node information 26 from the management node 3 and stores the received information in the node 2 before terminating processing.

In the above embodiment, a case in which the node 2 operates as a proxy management node is described, but the present embodiment is not limited to this. If the management node 3 is configured to update non-deletion/update node information 27, the node 2 does not perform processing at operation S115 in FIG. 23.

Figure 24:
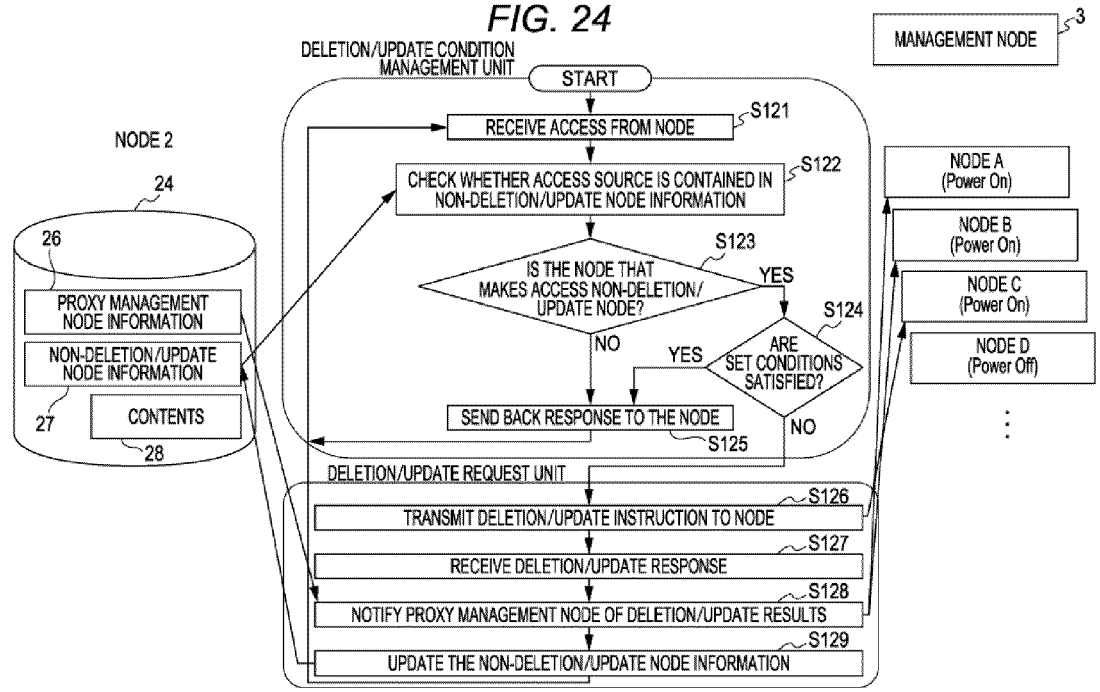
FIG. 24 is an operation chart depicting an example of processing performed in response to access from another node in the node according to the fifth embodiment.

FIG. 24 is an operation chart depicting processing performed in response to access from the other node 2 in the node 2 operating as a proxy management node.

Processing from operation S121 to operation S123 depicted in FIG. 24 corresponds to processing from operation S91 to operation S93 in FIG. 20 respectively. At operation S123, the node 2 operating as a proxy management node judges whether the node 2 that has made access is a node that has not performed deletion of contents or the like (non-deletion/update node). If, at operation S123, the node 2 that has made access is a non-deletion/update node, processing goes to operation S124, and if the node 2 is not a non-deletion/update node, processing goes to operation S125.

At operation S124, the node 2 operating as a proxy management node further judges whether stop conditions are satisfied. If the node 2 operating as a proxy management node judges that stop conditions are satisfied, processing continues to operation S124 and processing concerning deletion and/or update of contents is not performed. If the node 2 operating as a proxy management node judges that stop conditions are not satisfied, processing continues to operation S126. Processing at operation S126 and thereafter is the same as that at operation S95 and thereafter in FIG. 20.

When a response to a transmitted deletion request or the like is received by processing depicted in FIG. 24 by the node 2 from a non-deletion/update node that has accessed the node 2, the node 2 updates the non-deletion/update node information 27 and deletes information indicating the node that has sent back the response. Then, the node 2 that is accessed by the non-deletion/update node notifies the other nodes 2 holding the non-deletion/update node information of the update and deletion. The other nodes 2 that receive the notification perform processing similar to that depicted in FIG. 21 described in the fourth embodiment. That is, when the notification that the non-deletion/update node has performed deletion of contents or the like is received, the other nodes 2 that receive the notification update the non-deletion/update node information 27 held by the other nodes 2 and delete the information indicating the node that has performed deletion of contents or the like based on the notified contents.

If it is judged at operation S124 in FIG. 24 that stop conditions are satisfied (Yes at operation S124), information about deletion of contents such as held non-deletion/update node information may be deleted.

In the contents deletion/update method according to the present embodiment, as described above, the node 2 entrusted by the management node 3 has stop conditions set in advance. When accessed by a non-deletion/update node, the entrusted node 2 judges whether the set stop conditions are satisfied and if the set stop conditions are satisfied, a deletion request or the like is not transmitted to the non-deletion/update node that has made access. By setting the period or the like as stop conditions as in the above embodiment, a non-deletion/update node that is not connected to a network or does not perform communication with other nodes for a long period may be prevented from remaining in non-deletion/update node information in the node 2 without being deleted and/or updated.

Sixth Embodiment

In the present embodiment, a case in which a node that has not performed deletion and/or update of contents due to a power-off state will be described. The present embodiment is different from the above embodiments in that the entrusted node 2 may transmit a deletion request or update request to nodes, which are other than owning nodes of contents to be deleted and/or updated, that are very likely to communicate with nodes that have not performed deletion and/or update. The configuration and information held by the node 2 and the management node 3 are the same as those in the above embodiments and thus, a description thereof is omitted and the description will focus on differences.

The management node 3 transmits non-deletion/update node information 27 not only to the nodes 2 that have sent back a response, but also to nodes other than owning nodes that are very likely to communicate with nodes that have not performed deletion and/or update. Like owning nodes, the nodes 2 other than owning nodes that receive the non-deletion/update node information 27 transmit, when accessed by a node that has not performed deletion and/or update of contents, a deletion request or update request to the node that has made access.

FIG. 25 is a format example of non-deletion/update node information 27 transmitted from the management node 3 to the node 2. Information about a node other than an owning node of contents and is very likely to communicate with the nodes 2 that have not performed deletion of contents or the like is added.

Like the above embodiments, if a node that has received non-deletion/update node information 27 is accessed by a node described in the non-deletion/update node information 27, the node transmits a deletion request and/or update request of contents to the node that has made access. By transmitting a deletion request or the like also from nodes that are likely to communicate with nodes that need to perform deletion of contents or the like, when a node that has not performed deletion of contents or the like accesses a node that is likely to communicate with such a node, deletion or the like will be performed. Accordingly, the probability that deletion of contents or the like will be performed will be increased.

Further, like the fourth embodiment, a configuration in which a node likely to communicate with such a node may be caused to operate as a proxy management node may be adopted. When such a configuration is adopted, the management node 3 further transmits proxy management node information 26 to nodes likely to communicate with such a node to which non-deletion/update node information 27 has been transmitted. If a node likely to communicate with such a node receives proxy management node information, the node updates non-deletion/update node information 27 and makes a notification to other nodes holding non-deletion/update node information 27.

Like the fifth embodiment, the management node 3 may also be configured to transmit stop conditions for processing to transmit a deletion request or update request of contents to nodes to which non-deletion/update node information 27 is transmitted.

FIG. 26 is an operation chart depicting processing concerning deletion and/or update of contents in the management node 3.

First, at operation S131, a user such as a provider of contents decides to delete contents and so on and inputs an instruction thereof like operation S71 in FIG. 18. At operation S132, the user decides the stop conditions and inputs the conditions. Processing from operations S133 to S136 is similar to processing from operations S72 to S75 in FIG. 18.

At operation S137, non-deletion/update node information 27 is transmitted to nodes very likely to communicate with non-deletion/update nodes. Processing at operations S138 and S139 is similar to processing at operations S76 and S77 in FIG. 18.

In the above operation chart, the management node 3 transmits non-deletion/update node information 27 with stop conditions attached to nodes from which a response is sent back and those likely to communicate with non-deletion/update nodes and also proxy management node information 26 to such nodes, but the configuration is not limited to the above example. At operations S136 and S137, non-deletion/update node information 27 may be transmitted without attaching stop conditions. Also, a configuration in which nodes to which non-deletion/update node information 27 is transmitted are not caused to operate as proxy management nodes and instead, the non-deletion/update node information 27 is managed by the management node 3 may be adopted. In this case, processing at operations S138 and S139 is not performed.

FIGS. 27A, 27B, 28A, 28B, 29A, and 29B are diagrams illustrating effects of the deletion/update methods of contents described above when compared with conventional technology.

FIG. 27A depicts a conventional deletion method of contents. According to the method depicted in FIG. 27A, if there is any node in a power-off state when a deletion instruction is issued, the management node periodically transmits the deletion instruction to such a node. FIG. 27B depicts a deletion method of contents according to the above embodiment. In both figures, the management node is always in a power-on state.

It is assumed that the Node D holds contents A managed by the management node A and contents B managed by the management node B. An effect when the management node A issues an instruction to delete the contents A while the Node D is in a power-off state will be described in comparison to the conventional technology depicted in FIG. 27A.

As depicted in FIG. 27A, when the management node A transmits a deletion instruction to the Nodes A, B, C, and D holding the contents A, the Node D is in a power-off state. In this case, according to the conventional deletion method of contents, the management node A periodically transmits a deletion instruction until a response is received from the Node D.

Then, if the Node D is in a power-on state when a deletion instruction is received from the management node A, the Node D deletes the contents A according to the deletion instruction received from the management node A.

In contrast, according to the contents deletion method in the above embodiment, as depicted in FIG. 27B, even if the Node D is in a power-off state when a deletion instruction is transmitted from the management node A, the Nodes A, B, and C that have deleted the contents A and sent back a response to the management node A are entrusted by the management node A with transmission of a deletion instruction to the Node D. Thus, if the Node D accesses the management node B of the contents B to download the contents B after the Node D being turned on, the entrusted Node C transmits a deletion instruction to the Node D. The Node D deletes the contents A following the deletion instruction received from the Node C.

According to the conventional method, even if the Node D is turned on, the Node D may not be caused to delete the contents A as long as the Node D does not access the management node A. In contrast, according to the contents deletion method in the above embodiment, nodes that own the contents A and have sent back a response to an instruction from the management node A, that is, the Nodes A, B, and C that were in a power-on state when the management node A transmitted an instruction may recognize that it is necessary to delete the contents A from the Node D. By transmitting a deletion instruction to the Node D from the Node A, B, or C when the Node A, B, or C is accessed by the Node D, periodic transmission of a deletion instruction from the management node A is made unnecessary. By making transmission of an instruction from the management node A to the Node D, the contents A may be deleted without increasing communications traffic.

FIG. 28A depicts another conventional deletion method of contents. According to the method depicted in FIG. 28A, each node makes a notification of being in a power-on state to the management node of contents held by the local machine when switched from a power-off state to a power-on state. FIG. 28B depicts the contents deletion method according to the above embodiment. The contents deletion method depicted in FIG. 28B is the same as that depicted in FIG. 27B.

System configurations of FIG. 28A and FIG. 28B are similar to those of FIG. 27A and FIG. 27B and have the management nodes A and B and the Nodes A, B, C, and D. Like the case depicted in FIG. 27A and FIG. 27B, it is assumed that the management nodes are always in a power-on state and the Node D holds the contents A and B managed by the management nodes A and B respectively.

An effect when the management node A issues an instruction to delete the contents A while the Node D is in a power-off state will be described in comparison to the conventional technology depicted in FIG. 28A.

As depicted in FIG. 28A, the management node A may not periodically transmit a deletion instruction to the Node D that has sent back no response to an issued deletion instruction. However, each node may make a notification of power-on to the management node of held contents when switched to a power-on state. This applies not only to the Node D, but also to the Nodes A, B, and C that have deleted the contents A following an instruction from the management node A. Thus, unnecessary communication increases due to a notification of power-on from each node to the management node.

In FIG. 28B, by contrast, a problem as described in FIG. 28A does not arise. When the Node D is switched to a power-on state and any node having information indicating that the contents A has not been deleted in the Node D is accessed by the Node D, a deletion instruction of the contents A is issued to the Node D by the accessed node. Contents may thereby be efficiently deleted without causing unnecessary communication.

FIG. 29A depicts a conventional update method of contents. According to the method depicted in FIG. 29A, if there is any node in a power-off state when an update instruction is issued, the management node periodically transmits the update instruction to such a node. FIG. 29B depicts an update method of contents according to the above embodiment.

System configurations of FIG. 29A and FIG. 29B are similar to those of FIG. 27A and FIG. 27B, and FIG. 28A and FIG. 28B and have the management nodes A and B and the Nodes A, B, C, and D. Like the case depicted in FIG. 27A and FIG. 27B, and FIG. 28A and FIG. 28B, it is assumed that the management nodes are always in a power-on state and the Node D holds the contents A and B managed by the management nodes A and B respectively.

An effect when the management node A issues an instruction to update the contents A while the Node D is in a power-off state will be described in comparison to the conventional technology depicted in FIG. 29A.

As depicted in FIG. 29A, according to the conventional method, the management node A continues to periodically issue an instruction until a response is received from the Node D which could not receive an update instruction due to a power-off state. Even if the Node D is turned on in the meantime, the management node A cannot recognize that the Node D is turned on as long as the Node D does not access the management node A. In the example depicted in FIG. 29A, while the Node D accesses the management node B to download the contents B and the Node C during power-on, but no update instruction is issued during the period. Thus, it will take time before the contents A will be updated.

In contrast, according to the contents update method in the above embodiment, as depicted in FIG. 29B, when the Node D is turned on and the Node D accesses the Node C, the Node C issues an update instruction to the Node D in accordance with information received by the Node C from the management node A. Contents may thereby be efficiently updated without causing unnecessary communication.

In the contents update methods depicted in FIGS. 27A, 27B, 28A, 28B, 29A, and 29B, the management nodes are always in a power-on state, but the present embodiment is not limited to this. However, regarding update processing of contents, nodes to access the management node to receive information indicating owning nodes. Thus, in order to turn off the management node, it is necessary to adopt the contents update method according to the fourth embodiment to cause a node to operate as a proxy management node.

Figure 30:
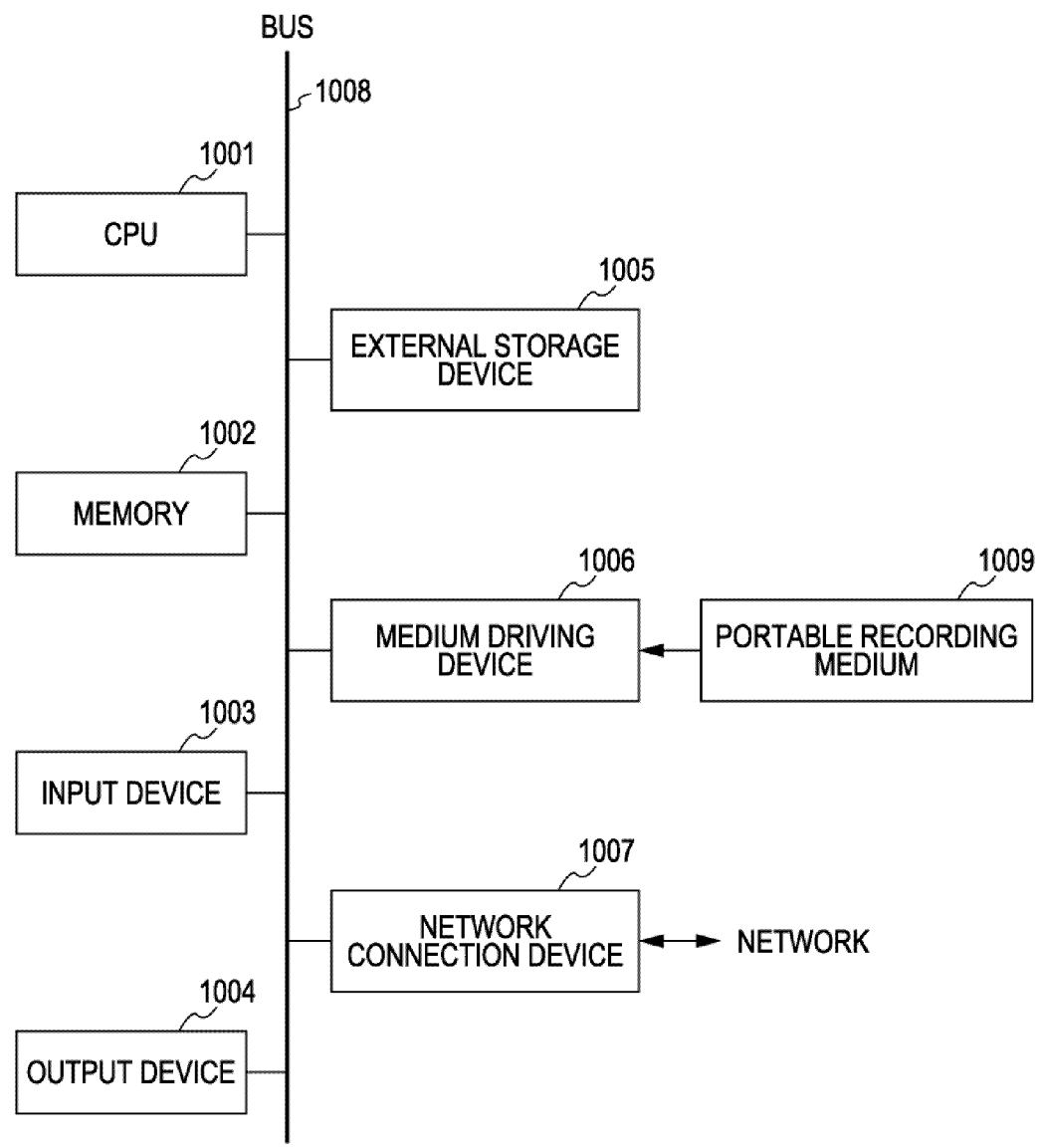
FIG. 30 is an example of the configuration diagram of an information processing apparatus.

The management node 3 and the node 2 depicted in FIG. 1 may be configured by using an information processing apparatus (computer) as depicted, for example, in FIG. 30. The information processing apparatus in FIG. 30 includes a CPU (central processing unit) 1001, a memory 1002, an input device 1003, an output device 1004, an external storage device 1005, a medium driving device 1006, and a network connection device 1007, and these components are mutually connected by a bus 1008.

The memory 1002 includes, for example, a ROM (read only memory) and RAM (random access memory) and stores programs and data used for processing. The CPU 1001 performs necessary processing by executing programs using the memory 1002.

The deletion/update request unit 32 and the deletion/update condition management unit 34 of the management node 3 in FIG. 1 and the deletion/update execution unit 22, the deletion/update request unit 23, and the deletion/update condition management unit 25 of the node 2 correspond to functions realized by executing programs stored in the memory 1002.

The input device 1003 is, for example, a keyboard, a pointing device, or a touch panel and is used to input instructions or information from the user. The output device 1004 is, for example, a display, a printer, or a speaker and is used to output an inquiry to the user or processing results.

The external storage device 1005 is, for example, a magnetic disk device, optical disk device, magneto-optical disk device, or a tape device. The information processing apparatus stores programs and data in the external storage device 1005 and uses the programs or data by loading the programs or data into the memory 1002 when necessary.

The medium driving device 1006 drives a portable recording medium 1009 and accesses recorded contents thereof. The portable recording medium 1009 is any computer-readable recording medium such as a memory card, flexible disk, CD-ROM (compact disk read only memory), optical disk, and magneto-optical disk. The operator stores the programs and data in the portable recording medium 1009 and uses the programs or data by loading the programs or data into the memory 1002 when necessary.

The network connection device 1007 is connected to any communication network such as a LAN (local area network) and the Internet and performs data conversion involved in communication. The information processing apparatus receives the program or data from an external device via the network connection device 1007 when necessary and uses the program or data by loading the program or data into the memory 1002.

Figure 31:
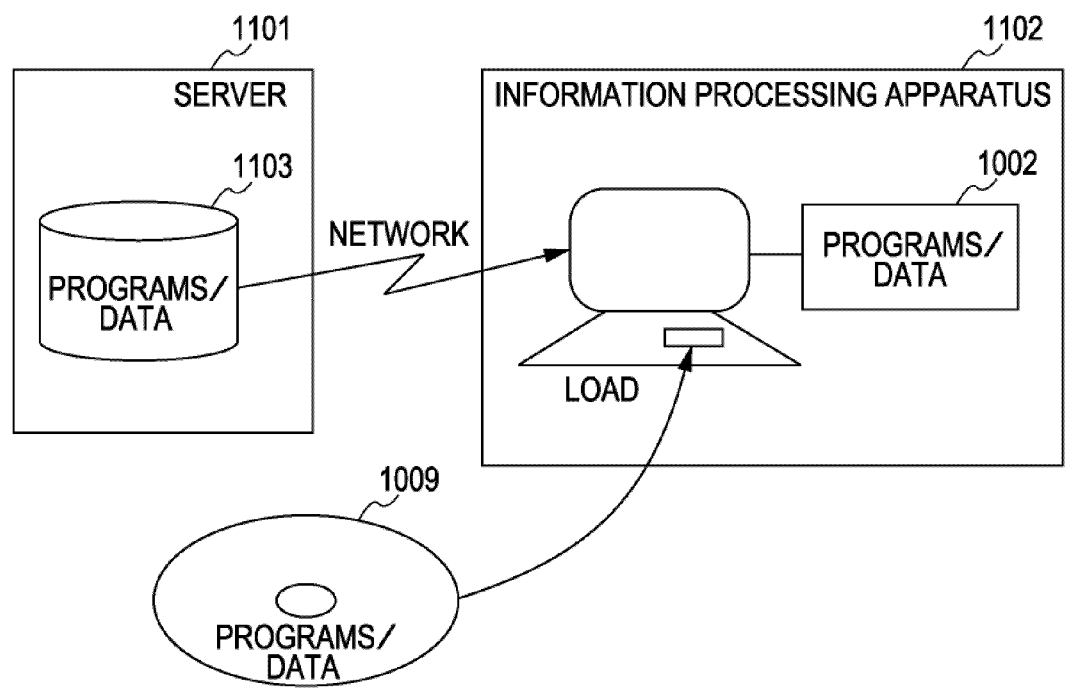
FIG. 31 is an example of the diagram illustrating a recording medium.
Figure 32:
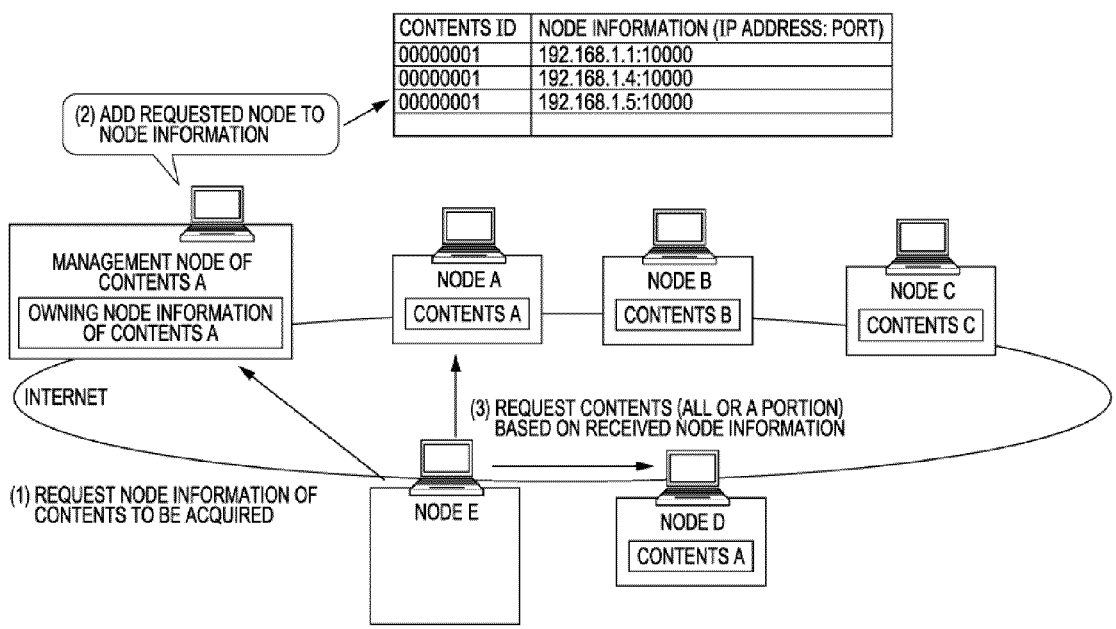
FIG. 32 is an example of the configuration diagram of a conventional P2P-type delivery system.

FIG. 31 depicts a computer-readable recording medium capable of supplying programs and data to the information processing apparatus in FIG. 30. Programs and data stored in the portable recording medium 1009 or a database 1103 of a server 1101 are loaded into the memory 1002 of an information processing apparatus 1102. The server 1101 generates a carrier signal to carry the programs and data and transmits the carrier signal to the information processing apparatus 1102 via any transmission medium in the network. The CPU 1001 executes the programs thereof using data thereof to perform necessary processing.

Further, according to an aspect of the embodiments, any combinations of the described features, functions and/or operations may be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A computer-readable recording medium storing a computer program for causing a computer to function as a node which deletes or updates contents shared by a plurality of nodes mutually connected via a network, the computer program causing the computer to execute:
    transmitting a deletion or update instruction to cause the nodes owning the contents to delete or update the contents based on owning node information indicating owning nodes which own the contents;
    transmitting, to a responding node that sends back a response to the deletion or update instruction, non-responding node information indicating a non-responding node, if there is any non-responding node that does not respond to the deletion or update instruction;
    judging whether a ratio of a number of nodes from which the response is received to a number of nodes to which the instruction is transmitted is equal to or more than a given threshold;
    retransmitting the deletion or update instruction to the non-responding node after a given period passes when the ratio is judged to be less than the given threshold; and
    transmitting the non-responding node information when the ratio is judged to be equal to or more than the threshold.

2. A computer-readable recording medium storing the computer program according to claim 1, the computer program causing the computer to further execute:
    deleting the non-responding node from the non-responding node information when receiving a notification that the non-responding node responds to a deletion or update instruction from the responding node; and
    transmitting the updated non-responding node information to the responding node.

3. The computer-readable recording medium storing the computer program according to claim 2, wherein
    the non-responding node information further includes a condition for stopping transmission of the deletion or update instruction to the non-responding node.

4. A computer-readable recording medium storing the computer program according to claim 1, the computer program causing the computer to further execute:
    generating response node information indicating the responding node; and
    transmitting the response node information to the responding nodes to which the non-responding node information is transmitted.

5. The computer-readable recording medium storing the computer program according to claim 4, wherein
    the non-responding node information further includes a condition for stopping transmission of the deletion or update instruction to the non-responding node.

6. The computer-readable recording medium storing the computer program according to claim 1, wherein the non-responding node information further includes a condition for stopping transmission of the deletion or update instruction to the non-responding node.

7. The computer-readable recording medium storing the computer program according to claim 1, wherein
the non-responding node information further includes a condition for stopping transmission of the deletion or update instruction to the non-responding node.

8. The computer-readable recording medium storing the computer program according to claim 1, the computer program causing the computer to further execute:
transmitting the non-responding node information to a node when the node is a node other than the responding node in the network and which may communicate with the non-responding node.

9. A computer-readable recording medium storing a computer program for causing a computer to function as a node which deletes or updates contents shared by a plurality of nodes mutually connected via a network, the computer program causing the computer to execute:
receiving a deletion or update instruction to delete or update the contents from a management node holding owning node information indicating nodes which own the contents;
deleting or updating the contents in accordance with the deletion or update instruction and transmitting a response to the management node;
receiving, from the management node, non-responding node information indicating a non-responding node that does not respond to the deletion or update instruction and storing the non-responding node information in a storage unit; and
when recognizing that there is access from the non-responding node, transmitting the deletion or update instruction to the non-responding node that makes access based on the non-responding node information stored in the storage unit;
deleting the non-responding node from the non-responding node information stored in the storage unit when receiving a response from the non-responding node to which the deletion or update instruction is transmitted; and
transmitting a notification that a response has been received from the non-responding node to the management node.

10. A computer-readable recording medium storing the computer program according to claim 9, the computer program causing the computer to further execute:
storing the responding node information in the storage unit when receiving responding node information indicating the responding nodes from the management node;
deleting the non-responding node from the non-responding node information stored in the storage unit and transmitting the updated non-responding node information to other responding nodes described in the responding node information when receiving a response from the non-responding node to which the deletion or update instruction is transmitted; and
storing the received non-responding node information again in the storage unit when receiving the updated non-responding node information.

11. The computer-readable recording medium storing the computer program according to claim 10, the computer program causing the computer to further execute:
storing a condition in the storage unit when receiving, from the management node, a stop condition for stopping transmission of the deletion or update instruction to the non-responding nodes; and
stopping to transmit the deletion or update instruction to the responding node when an access from the non-responding node occurs and the stop condition stored in the storage unit is satisfied.

12. The computer-readable recording medium storing the computer program according to claim 9, the computer program causing the computer to further execute:
storing a condition in the storage unit when receiving, from the management node, a stop condition for stopping transmission of the deletion or update instruction to the non-responding node; and
stopping to transmit the deletion or update instruction to the responding node when an access by the non-responding node occurs and the stop condition stored in the storage unit is satisfied.

13. The computer-readable recording medium storing the computer program according to claim 9, the computer program causing the computer to further execute:
storing a condition in the storage unit when receiving, from the management node, a stop condition for stopping transmission of the deletion or update instruction to the non-responding node; and
stopping to transmit the deletion or update instruction to the responding node when an access from the non-responding node occurs and the stop condition stored in the storage unit is satisfied.

14. A contents deletion or update system comprising:
a management node including;
a processor to execute;
transmitting a deletion or update instruction to cause a node owning contents to delete or update the contents based on owning node information depicting an owning node which own the contents,
transmitting, when there is a non-responding node that does not respond to the deletion or update instruction, non-responding node information indicating the non-responding node to a responding node that has responded to the deletion or update instruction;
judging whether a ratio of a number of nodes from which the response is received to a number of nodes to which the instruction is transmitted is equal to or more than a given threshold;
retransmitting the deletion or update instruction to the non-responding node after a given period passes when the ratio is judged to be less than the given threshold;
transmitting the non-responding node information when the ratio is judged to be equal to or more than the threshold;
deleting the non-responding node from the non-responding node information stored in the storage unit when receiving a response from the non-responding node to which the deletion or update instruction is transmitted; and
transmitting a notification that a response has been received from the non-responding node to the management node;
and
a node including;
another processor to execute;
receiving, from the management node, the deletion or update instruction to delete or update the contents holding the owning node information indicating nodes which own the contents, deleting or updating the contents in accordance with the deletion or update instruction, transmitting a response to the management node, receiving the non-responding node information indicating the non-responding nodes that do not respond to the deletion or update instruction from the management node, and storing the non-responding node information in a storage unit, transmitting another deletion or update instruction to the non-responding node that makes an access, based on the non-responding node information stored in the storage unit, when recognizing that the non-responding node makes the access.

15. A node which deletes or updates content, the node comprising:

a processor to execute;

transmitting a deletion or update instruction to cause a node owning contents to delete or update the contents based on owning node information indicating an owning node which owns the contents;

transmitting, when there is a non-responding node that does not respond to the deletion or update instruction, non-responding node information indicating the non-responding node to a responding node that responds to the deletion or update instruction;

judging whether a ratio of a number of nodes from which the response is received to a number of nodes to which the instruction is transmitted is equal to or more than a given threshold;

retransmitting the deletion or update instruction to the non-responding node after a given period passes when the ratio is judged to be less than the given threshold; and transmitting the non-responding node information when the ratio is judged to be equal to or more than the threshold.

16. A node which deletes or updates content, the node comprising:

a processor to execute;

receiving a deletion or update instruction to delete or update contents from a management node holding owning node information indicating a node which owns the contents, deleting or updating the contents in accordance with the deletion or update instruction, and transmitting a response to the management node, receiving, from the management node, non-responding node information indicating the non-responding nodes that do not respond to the deletion or update instruction, and storing the non-responding node information in a storage unit, when recognizing that the non-responding node makes access, transmitting another deletion or update instruction to the non-responding node that makes access based on the non-responding node information stored in the storage unit;

deleting the non-responding node from the non-responding node information stored in the storage unit when receiving a response from the non-responding node to which the deletion or update instruction is transmitted; and transmitting a notification that a response has been received from the non-responding node to the management node.

17. A method that causes a computer to function as a node which deletes or updates contents shared by a plurality of nodes mutually connected via a network, the method causing the computer to execute:

transmitting a deletion or update instruction to cause a node owning the contents to delete or update the contents based on owning node information indicating an owning node which owns the contents;

transmitting, when there is a non-responding node that does not respond to the deletion/update instruction, non-responding node information indicating the non-responding node to a responding node that responds to the deletion or update instruction;

judging whether a ratio of a number of nodes from which the response is received to a number of nodes to which the instruction is transmitted is equal to or more than a given threshold;

retransmitting the deletion or update instruction to the non-responding node after a given period passes when the ratio is judged to be less than the given threshold; and transmitting the non-responding node information when the ratio is judged to be equal to or more than the threshold.

18. A method that causes a computer to function as a node which deletes or updates contents shared by a plurality of nodes mutually connected via a network, the method causing the computer to execute:

receiving a deletion or update instruction to delete or update the contents from a management node holding owning node information indicating a node which owns the contents, deleting or updating the contents in accordance with the deletion or update instruction, and transmitting a response to the management node, receiving non-responding node information indicating the non-responding node that does not respond to the deletion or update instruction from the management node, and storing the non-responding node information in a storage unit, when recognizing that the non-responding node makes access, transmitting the deletion or update instruction to the non-responding node that makes access based on the non-responding node information stored in the storage unit;

deleting the non-responding node from the non-responding node information stored in the storage unit when receiving a response from the non-responding node to which the deletion or update instruction is transmitted; and transmitting a notification that a response has been received from the non-responding node to the management node.

* * * * *